United States Patent
Castelle

(10) Patent No.: US 9,771,714 B2
(45) Date of Patent: Sep. 26, 2017

(54) VACUUM INSULATION PANEL

(71) Applicant: Jerry Castelle, Old Bethpage, NY (US)

(72) Inventor: Jerry Castelle, Old Bethpage, NY (US)

( * ) Notice: Subject to any disclaimer, the term of this patent is extended or adjusted under 35 U.S.C. 154(b) by 0 days.

(21) Appl. No.: 15/014,268

(22) Filed: Feb. 3, 2016

(65) Prior Publication Data

US 2016/0186427 A1 Jun. 30, 2016

Related U.S. Application Data

(63) Continuation-in-part of application No. 13/067,541, filed on Jun. 7, 2011, now abandoned.

(60) Provisional application No. 61/355,814, filed on Jun. 17, 2010.

(51) Int. Cl.
*E04B 1/74* (2006.01)
*E04B 1/76* (2006.01)
*E04B 1/80* (2006.01)
*E04C 2/02* (2006.01)
*E04B 2/00* (2006.01)
*B32B 1/08* (2006.01)

(52) U.S. Cl.
CPC .............. *E04B 1/7675* (2013.01); *B32B 1/08* (2013.01); *E04B 1/7612* (2013.01); *E04B 1/7625* (2013.01); *E04B 1/7629* (2013.01); *E04B 1/803* (2013.01); *E04C 2/02* (2013.01); *E04C 2/46* (2013.01); *B32B 2419/00* (2013.01); *Y10T 428/13* (2015.01)

(58) Field of Classification Search
None
See application file for complete search history.

(56) References Cited

U.S. PATENT DOCUMENTS

| | | | | |
|---|---|---|---|---|
| 2,104,500 | A * | 1/1938 | Van Buren | E04B 1/76 52/144 |
| 3,302,358 | A * | 2/1967 | Jackson | E04B 1/803 206/558 |
| 3,341,395 | A * | 9/1967 | Weber | E04C 2/3405 428/134 |
| 3,364,639 | A * | 1/1968 | Davenport | E04B 1/80 52/309.15 |
| 4,167,598 | A * | 9/1979 | Logan | B32B 3/28 181/288 |
| 4,228,869 | A * | 10/1980 | Bschorr | G10K 11/172 181/286 |
| 5,011,729 | A * | 4/1991 | McAllister | B65D 90/025 206/524.8 |

(Continued)

*Primary Examiner* — Elizabeth A Quast

(57) ABSTRACT

A manufactured apparatus formed via a deep drawn stamping process for use within a building as an insulation device applied both to the exterior sheathing of an existing or new edifice and also above the ceiling plane below its roof structure; which consists of two half vessels made from malleable material, each containing similar structural appurtenances on their exterior faces, which when bonded together encase a cruciform rigid plastic grid-like lattice having many apertures therein for the complete removal of air within this subsequently sealed vessel. This complete state of vacuum totally prevents or drastically stops the transmigration of heat energy loss via conduction and convection from the interior of a building's space to the outside environment during the winter months; and vice versa, thus also retarding any interior gain of ambient heat during the hot summer months.

3 Claims, 6 Drawing Sheets

(56) References Cited

U.S. PATENT DOCUMENTS

| | | | | |
|---|---|---|---|---|
| 5,091,233 A * | 2/1992 | Kirby | ........................ | B32B 1/06 206/484 |
| 5,153,977 A * | 10/1992 | Toida | ..................... | B23K 1/001 228/176 |
| 5,157,893 A * | 10/1992 | Benson | .................. | A47J 27/002 52/406.3 |
| 5,273,801 A * | 12/1993 | Barry | .................... | F16L 59/065 206/484.2 |
| 5,500,305 A * | 3/1996 | Bridges | ................... | E04B 1/803 29/897.32 |
| 5,527,411 A * | 6/1996 | Jutte | ..................... | B29C 70/525 156/204 |
| 5,791,551 A * | 8/1998 | Parks | ................... | B23K 1/0008 228/173.1 |
| 5,792,539 A * | 8/1998 | Hunter | .................... | B32B 3/28 428/178 |
| 5,904,972 A * | 5/1999 | Tunis, III | .............. | B29C 43/021 428/118 |
| 6,037,033 A * | 3/2000 | Hunter | ..................... | B32B 3/28 428/178 |
| 6,264,092 B1 * | 7/2001 | Yasuda | .................. | B23K 1/001 228/161 |
| 6,659,037 B2 * | 12/2003 | Hagopian | ................. | G01D 5/10 116/266 |
| 6,669,553 B2 * | 12/2003 | Adams | .................... | F24F 13/24 454/237 |
| 6,739,104 B2 * | 5/2004 | Tokonabe | ................. | B32B 3/12 428/116 |
| 7,562,507 B2 * | 7/2009 | Fleming | .................. | E04B 1/803 428/69 |
| 7,652,417 B2 * | 1/2010 | Yotani | ................... | H01J 29/028 313/495 |
| 8,347,575 B2 * | 1/2013 | Bierwirth | .............. | E04F 15/182 181/284 |
| 8,765,247 B2 * | 7/2014 | Park | ........................ | E04B 1/803 428/69 |
| 9,140,053 B2 * | 9/2015 | Luck | ......................... | B64B 1/14 |
| 2008/0289898 A1 * | 11/2008 | Rickards | ................ | E04B 1/803 181/141 |
| 2010/0095622 A1 * | 4/2010 | Niemoller | ................. | B32B 3/12 52/407.5 |

* cited by examiner

VACUUM INSULATION PANEL

BACKGROUND OF THE INVENTION

This invention relates to building insulation, as measured by three performance characteristics; viz. Thermal conductance, or K-value; . . . Thermal resistance, or R-value, and Thermal transmittance, or U-value; and in particular to the use of vacuum technology to prevent conductance and convection from adversely affecting the interior temperature and level of comfort within a building.

FIELD OF THE INVENTION

This invention relates to vacuum insulated panels VIP covering the complete envelope of the building with hermetically sealed closed vacuum evacuated vessels, thereby specifically increasing the R-value performance characteristic of the building insulation material; thus preventing the loss of expensively produced heat within the interior during the winter months and the need to expensively cool the interior during the hot summer months.

DESCRIPTION OF THE PRIOR ART

This instant invention enhances the three aforementioned related performance characteristics by utilizing vacuum technology within a building's envelope; viz. thermal conductance, or K-value; thermal resistance, or R-value and thermal transmittance, or U-value; which are all three important measurements used to quantify the degree of prevention or retardation of heat loss or heat gain within a building's interior. R-value is in fact the reciprocal of U-value. A definition of R-value based on apparent thermal conductivity, or K-value, has been proposed in document C168 published by the American Society for Testing and Materials. This bulletin describes heat being transferred by all three thermodynamic molecular transmigration of flow mechanisms, i.e. conduction, radiation, and convection; whereby a closed vessel or container devoid of its air contents, herein being sought for patent approval significantly affects all three latter modalities, which favorably impact the three aforementioned performance characteristics of an insulation material to resist conducted, radiated or convective heating.

Traditionally, building insulation materials consist of thermal insulation used in the construction of buildings. These materials as conventionally used can unfortunately only somewhat retard heat transfer by the three aforementioned mechanisms; i.e. conduction, radiation or convection; whereby these insulation materials are employed, either singularly, or in varying combinations to achieve the desired outcome; which is usually thermal comfort with reduced energy consumption. Their main disadvantage however, is that they do not totally prevent the transfer of energy, but instead can only somewhat slow or retard the transmigration of heat molecules. It is well known in the prior art that excellent thermal insulation capability has been achieved by creating a vacuum state within a hermetically sealed closed vessel. Perhaps the most common device utilizing this principle is the ordinary ubiquitous thermos bottle or vacuum Dewar flask. Instead, the novel approach to vacuum technology utilization within this invention solves this transmigration of heat energy molecules dilemma by completely stopping the molecular transfer of heat. Thus, conventional insulation's usefulness can either be categorized by its composition (material), or by its form (structural or non-structural), or by its functional mode (conductive, radiant, convective). Some of the more conventional products used today are wood chips, fiber-glass blankets, urea formaldehyde sprayed in-foam, cellulose loose fill, molded polystyrene and polyurethane rigid panels. The performance capabilities of these aforementioned insulation products are classified via an R-rating resistance factor; which is to say R-value. A rating of R-1 per inch is attributable to wood chips; while the R-value rating proportionately increases within this list to a maximum R-rating of R-3 per inch for polyurethane rigid panels. Today, many manufacturers have sought to increase the R-ratings of insulation with questionable success, and therefore the present status quo abounds with no new technological improvements on the horizon.

It is a fact that the thermo-molecular energy of heat transmission molecules always flow from a warmer heat source to a colder area. Unfortunately, conventional insulation materials can only somewhat slow the pace of this transmigration of heat energy from the interior of a building's expensively heated space to the outside cold air during the winter months. This transmigration of energy also occurs during the hot summer months as well, but only in the reverse direction. Therefore, a major problem exists today in that the threat of oil prices and the escalating quantity of importation of crude oil barrels to heat and cool a building has become a source of deep concern attributable to the high cost of imported crude oil. Especially, since we are quickly running out of cheaply produced crude oil. This high cost is eventually passed on to a building's owner to both heat and cool a building.

Therefore, should the price of heating oil rise to $5 per gallon retail, then, this will become a major factor for owners in selecting the most energy efficient insulating material for their buildings. Since heat molecules via convection air currents rise, then the predominant loss of heat from, (during winter) . . . or gain of heat into (during summer), a building's interior is via the structure's ceiling or roof. This vacuum technology with its unique design of removing the inside air contents of this vacuum canister affords an owner of any building, the best possible solution in overcoming the disadvantages and pitfalls of each of the aforementioned conventionally used materials within their quest to save energy and money. Thus, it is expressly enhanced with the use of this invention's quintessential avant-garde vacuum technology, which heretofore has not been used successfully in building construction today. Therefore, this invention constitutes a fresh and different approach to solving this transmigration of molecular energy problem. Accordingly, science dictates that the only forces at work for the transfer of heat energy in a building is via the three aforementioned modalities; viz. conduction; radiation and convection energy flow. Hence, the perfect insulator becomes in fact a vacuum. In a vacuum, heat cannot transfer by conduction, because there are no molecules present to collide with and transfer the heat energy via molecular vibrations. It is for this same reason that convection heat transfer in a vacuum also fails, since there is no fluid medium (i.e. no air present) for thermo-molecular energy transfer to take place. Therefore, in a vacuum, only radiant heat transfer can take place in the form of photon emission. The reflective nature of the inherent color of aluminum which is silver, thus retards heat molecular transmigration from this loss of radiant energy by reflecting the energy back into the interior space. By any large, the utility and principle of vacuum insulation technology is well known in the prior art. However, this present invention differs from those of the prior art in that it commands a unique design, whereby the maximum R-value per inch utilized within a typical retrofit application is estimated to be R-50 per inch. Therefore, a discussion of the related prior art, of which the present inventor is aware, and its differences and distinctions from this present invention is provided herein as follows:

PRIOR ART

U.S. Pat. No. 1,239,770 issued on Sep. 11, 1917 to Coleman, C J, titled Heat Insulation Wall—This prior art is markedly similar to U.S. Pat. No. 4,513,041 in concept. However, this present application under patent review herein is an apparatus which is tied to a particular die/press machine process; whereby a plain sheet of aluminum material is subsequently transformed into hermetically sealed vessels containing structural appurtenances capable of resisting crushing atmospheric forces when a vacuum is created therein. Instead, this prior art clearly indicates that the shape of these vacuum vessels are elliptical with no indication via any mentioned manufacturing process of how the vacuum within vessels are created and sealed. Another major difference is that the elliptical vessels are not inextricably adhered to one another as this present invention so that interior heat will escape between the sides of each vessel. Moreover, these elliptical vacuum vessels are made of glass or ceramic which are both fragile and heavy; thereby lacking commercial success because the atmospheric pressure will implode the structure once vacuum is introduced.

U.S. Pat. No. 4,513,041 issued on Apr. 23, 1985 to Dellue, Rene E., titled "Tubular vacuum-tight enclosures for thermal and acoustical insulating panels" This prior art teaches plastic material shaped as elliptical or oval tubes; both ends of which have perforated plugs. The tubes with the inserted plugs are then placed inside a thin flexible sheath of impervious plastic material e.g. PVD which is longer than the tubes and then sealed on both ends by using offset rows forming aveoles. Comparing the two methods of producing the apparatus in this prior art and this application under review, this prior art teaches nothing which could have been utilized or borrowed for the conception of this invention under review.

U.S. Pat. No. 7,562,507 issued on Oct. 20, 2005 to Wallace E. Fleming, titled "Vacuum Insulated Building Panel" A comparison of this prior art reference teaches a large cumbersome and awkward vacuum building panel comprised of two interior and exterior steel or glass plates which sandwich a plurality of perimeter placed wood post members with spheres in the middle. Unlike the invention under consideration herein, this prior art does not teach as to how the vacuum state is achieved and then sealed. Moreover, the differences between the two inventions are vast in that the prior art are large steel or glass plates, sandwiching wood posts whereas this present invention calls for geometric vacuum vessels as repeating small units aligned to one another to form a continuous vacuum barrier.

U.S. Pat. No. 6,659,037 issued on Dec. 9, 2003 to Eric M. Hagopian, titled, "Method and Apparatus for the Evaluation of Vacuum Insulation Panels." This prior art teaches an insulated core material; in addition to a barrier film enclosing said core material which is configured for maintaining a vacuum state within said vacuum insulated panel. Also, it discloses mainly a vacuum detection indicator for detecting the presence of an effective vacuum state in the VIP panel, comprising a spring device within the cavity of said core material which is compressed in the presence of said vacuum state or perhaps expanded in the complete absence of a vacuum. It is thus noteworthy to mention that said invention mainly claims 14 out of 20 vacuum detection indicators for evaluating the integrity of the vacuum state within this VIP patent. Hence, these VIP's have the potential to be reused, and therefore possibly damaged whereby the vacuum state within the VIP is compromised. Therefore, only via the presence of said vacuum detection indicator can the integrity of the effective vacuum state within the VIP panel be ascertained. Accordingly, this prior art distinguishes itself from the present application under review which is not a core panel inserted into a barrier film having an electrically activated vacuum detection indicator within the core.

U.S. Pat. No. 5,792,539 issued on Aug. 11, 1998 to Rick Cole Hunter, entitled; "Insulation Barrier." This prior art, teaches thermal insulation elements using a structural material with a reflective surface and stacking of the elements like "dixie" cups; . . . whereby this disclosure merely teaches an apparatus such as a vacuum barrier with alternating stacking elements. This invention thus describes a rigid multi-layered thermal insulation barrier which is by and large, a box within a box, much like a refrigerator, except that this invention's barrier is made of alternating stacking thermal insulation elements. It appears from the description of said invention that several embodiments may be selected. One, where the geometric shape of the stacked thermal insulation elements is a beam formed by a sine-like wave design. The other embodiment may be a cone-like entity. Thus, the thermal insulation elements vacillate between beam-like or cone-like designs. Additionally, the outer skins extend beyond the thermal insulation barrier to form an envelope around the barrier, thus providing edges which seal the envelope by utilizing an adhesive. The invention also describes an insulation panel comprised of an envelope of thin skin high gas barrier material and a thermal insulation barrier which supports said skin, the latter which surrounds said barrier, then becomes subsequently evacuated. Another chief distinction of this invention is the use of a getter material which entraps the residual gases within the VIP panel after evacuation takes place. Hence, the descriptive nature of this Rick Hunter invention appears vastly different from the described application under consideration for a patent herein.

U.S. Pat. No. 5,756,179 issued on May 26, 1998 to Ralph B. Jutte, entitled "Insulating Modular Panels incorporating Vacuum Insulation Panels". This prior art is distinguished from the instant invention herein under consideration whereby these insulating modular panels are produced as a continuous block where the gaps between the panels are produced as a continuous block; said gaps being filled with foam or preformed filler material to form a continuous core, which has applied to it a resin fiber reinforcing material. In other words, the inner core of material consists of hollow panels filled with a foam-like mixture to create a foam filled panel having a fiber reinforced plastic skin (FRP). This prior art teaches a design intent exclusively for refrigerated shipping containers, walk-in-coolers, refrigerators, and freezers. Although this invention states that each embodiment may contain at least one vacuum insulation panel, the description of the prior art is vague on this precise method of achieving a vacuum state. It does however, describe the process of folding the resin impregnated reinforcement materials upward and downward to cover the sides of the continuous enclosed core. The only reference to a vacuum state lies outside of the legal claims, and instead resides within the detailed description, which states that said enclosure core is evacuated to create a vacuum in the enclosure which thereby reduces heat transfer. It further describes the VIP panel as a 3 mil. thick stainless steel jacket formed into a pan shaped cavity for receiving insulating media and then welded tight to create a hermetic seal. Thus, the foregoing description of this patented VIP panel fails to make a similar comparison to the instant invention under consideration herein as possibly being infringing art. It is also noteworthy to mention that U.S. Pat. No. 5,527,411 is the same invention as the forgoing patented described.

U.S. Pat. No. 5,252,408 issued on Oct. 12, 1993 to John Bridges, Philip Neal and John Besser entitled, "Vacuum Insulated Panel and Method of Forming a VIP." This invention relates to a vacuum insulated panel comprising first and second peripherally joined stainless steel metal panels defining a cavity, a compressed cake of silica gel positioned within said cavity, a device for assisting in creating a vacuum within the cavity; whereby the compressed cake comprises a particulate getter material. It also possesses a fiberglass reinforcing structure for preventing the getter material from coming into contact with the first and second metal panels. This invention is cited in particular for insertion within cabinet walls of refrigerators and freezers. The cavity is subsequently sealed at the periphery, after the evacuation of the panel of its air contents by heating the same for 2 hours at a temperature of 650° F. to achieve the desired vacuum; whereby the carbon or silica gel layer sandwiched between two fiberglass batts yielded an R-value of approximately 46. All of the foregoing thus describes an art form completely different when compared to the instant invention under consideration herein.

U.S. Pat. No. 5,500,305 issued on Mar. 19, 1996 to John Bridges, Philip Neal and John Besser entitled, "Vacuum Insulated Panel and Method of Making a VIP." The description of this prior art is practically identical in every respect to the foregoing above described U.S. Pat. No. 5,252,408.

U.S. Pat. No. 6,125,540 issued on Oct. 3, 2000 to Calvin L. Court et. al. entitled "Continuous process for forming structure suitable for use as a core member." Of all the prior art being compared to this application being examined for patentability, this prior art is the farthest from appearing related at all. It is merely a structural thermoplastic tubular core assemblage of various geometric shapes, such as circles, triangles, squares, and hexagons, transversely cut having spaced cut ends used in many different fields and many different applications. It is a sandwich panel formed by utilizing this aforementioned different shaped core element with two outer layers of any laminated material with the core material in the middle. There is no vacuum state, thus it certainly cannot be used as an insulation material.

U.S. Pat. No. 4,053,667 issued on Oct. 11, 1977 to Bruce W. Smith entitled :Stiffened structural laminate and method of molding laminate with stiffener beads." Although a vacuum is used in the forming process within this prior art, it is simply a means toward production, in that no vacuum final state, devoid of air contents is embodied within this prior art. It also is not a hermetically sealed closed vessel with an internal vacuum state therein. It is simply a lightweight sandwich which can be crushed over an aluminum, or paper honeycombed shaped core, or, instead a vacuum is used to seal the fabric over the core. It is used as a lightweight structural panel on either airplanes or boats around windows; . . . and not meant nor can be used as a building insulation material, because the impregnated fabric is thus porous and will not support a vacuum state.

U.S. Pat. No. 3,899,805 issued on Aug. 19, 1975 to William J. McMillan entitled "Indented Sheet." This prior art teaches as a completely different invention in that it is essentially a sheet of material with hollow projections open to the air and not hermetically sealed as this present application under consideration with its hermetically sealed top and bottom vessels, while subsequently the air contents are withdrawn by vacuum. The differences are apparent because this prior art makes no mention of removing the air contents and creating a vacuum state such that it is called "an indented sheet" not a hollow vessel. Further, it is made of thermoplastics, which material will degas and over time erode any vacuum state therefore it cannot be used as a building insulation material.

U.S. Pat. No. 4,598,522 issued on Jul. 8, 1986 to William J. Hoofe, III entitled "Interlocking panels." This prior art teaches that although a vacuum or injection molding may be used in its forming process, it is simply a means of production in that no vacuum final state devoid of air contents is embodied herein within this prior art. Thus, in its final state it does not become a hermetically sealed closed vessel with an internal vacuum state therein. It is simply an exterior application to a building's roofing or siding merely used as a decorative waterproof roofing panel or exterior siding and definitely not used as insulation material. It also does not become in its final state a closed vessel, hermetically sealed and devoid of its air contents containing a vacuum.

U.S. Pat. No. 5,157,893 issued on Oct. 27, 1992 to David K. Benson entitled "Compact Vacuum Insulation."—This prior art teaches that although a vacuum is required in this process it does not explain how the air is going to be evacuated. Essentially, the enclosed vessel starts with two thin sheets of metal material which are thin and bendable to form curved panels in close proximity to one another, only separated by glass spherical beads which render the vacuum space surrounding the beads to not collapse when air is withdrawn. The ends of the two sheets are welded together but the end sealing is not fully explained. There is no geometrical shape to this prior art and its main feature is to bend around curved surfaces.

U.S. Pat. No. 6,141,930 issued on Nov. 7, 2000 to Robert John Allwein, entitled "Method of and article for insulating standard and non-standard cavities and an insulated structure." This prior art is nothing more than conventional fiberglass batt insulation customized and cut into non-standard widths to accommodate less than the standard width encountered in at least 25% of the times during normal construction projects. It thus bears no relationship whatsoever to the patent application under consideration herein. There is no vacuum state therein whereby the disclosure concerning this prior art is totally different when compared to the invention under review.

U.S. Pat. No. 6,264,092 issued on Jul. 24, 2001 to Shinya Yasuda, et al entitled "Method for sealing vacuum structure." This prior art, teaches only a method for sealing a metal vacuum structure through an evacuation port, then sealing the evacuation port by placing brazing material in its molten state using a very high temperature and subsequently making the evacuation port disappear and utilizing a "drop preventing member" formed in a recess comprised of a mesh-like wire sheet. It is obvious that brazing by definition involves heating brass metal to a molten state which melting temperature is 1800 degrees Farenheit, which would tend to melt any metal vacuum structure other than steel. Therefore, this claimed method differs drastically from the application under consideration herein; wherein this invention under consideration definitely teaches a very different method for sealing a vacuum panel. The method for sealing this invention under consideration is the compressible rubber material through which the vacuum needle is inserted and which closes shut when the needle is withdrawn. The actual sealing occurs from two separate and distinct disks placed over the aperture with a final epoxy layer coating over the disks as a further sealing agent.

U.S. Pat. No. 6,860,082 issued on Mar. 1, 2005 to Naotaka Yamamoto entitled "Heat insulating wall member, and method of manufacturing same." Yamamoto came several years after Yashuda (U.S. Pat. No. 6,264,092) and Fasci (U.S. Pat. No. 6,276,549). The idea of using a vacuum as an insulation medium goes way back to U.S. Pat. No. 1,239,770 granted to Coleman, C. J. on Sep. 11, 1917. Furthermore, several variations on that same idea have been granted patentability over the years. Yamamoto, teaches that the insulating wall is claimed to be a laminated body made of two heat insulating members; a first and second, which are plate-like. Whereas the application under review bears no resemblance to this stated method of assembly. Yamamoto also teaches further "differences" in that said heat insulating members are pillar shaped unlike that under review. Second, it is claimed that the filler insulating material which is injected is formed of expanding urethane foam, thus creating a sandwiched composition; and that the seal support portions are concave in nature. It also teaches that the insulating wall is produced by utilizing a vacuum insulation member by placing this expanded urethane foam into a 25 lb bag made of aluminum laminated film which is subsequently evacuated. But it doesn't teach how the vacuum is created.

U.S. Pat. No. 6,276,549 issued on Aug. 21, 2001 to Mirta Mabel Fasci entitled "Modular container that can be interconnected, for multiple uses." This prior art is directed solely as a recycling program geared mainly to rid the environment of plastic bottles and metallic cans so that instead of throwing them away in the garbage, one can accumulate these empty containers and compose modular blocks or structures for all types of applications, i.e. recreational, functional, ornamental. These containers will all be interconnected both laterally, and top to bottom having recesses and salients. The differences are that they will either be left empty and filled with air, or padded with fillers. No vacuum will be used, and further, in its claimed state it certainly can't be used as building insulation because a vacuum state is completely lacking.

DETAILED DESCRIPTION OF THE DRAWINGS

FIG. 1

Figure 1:
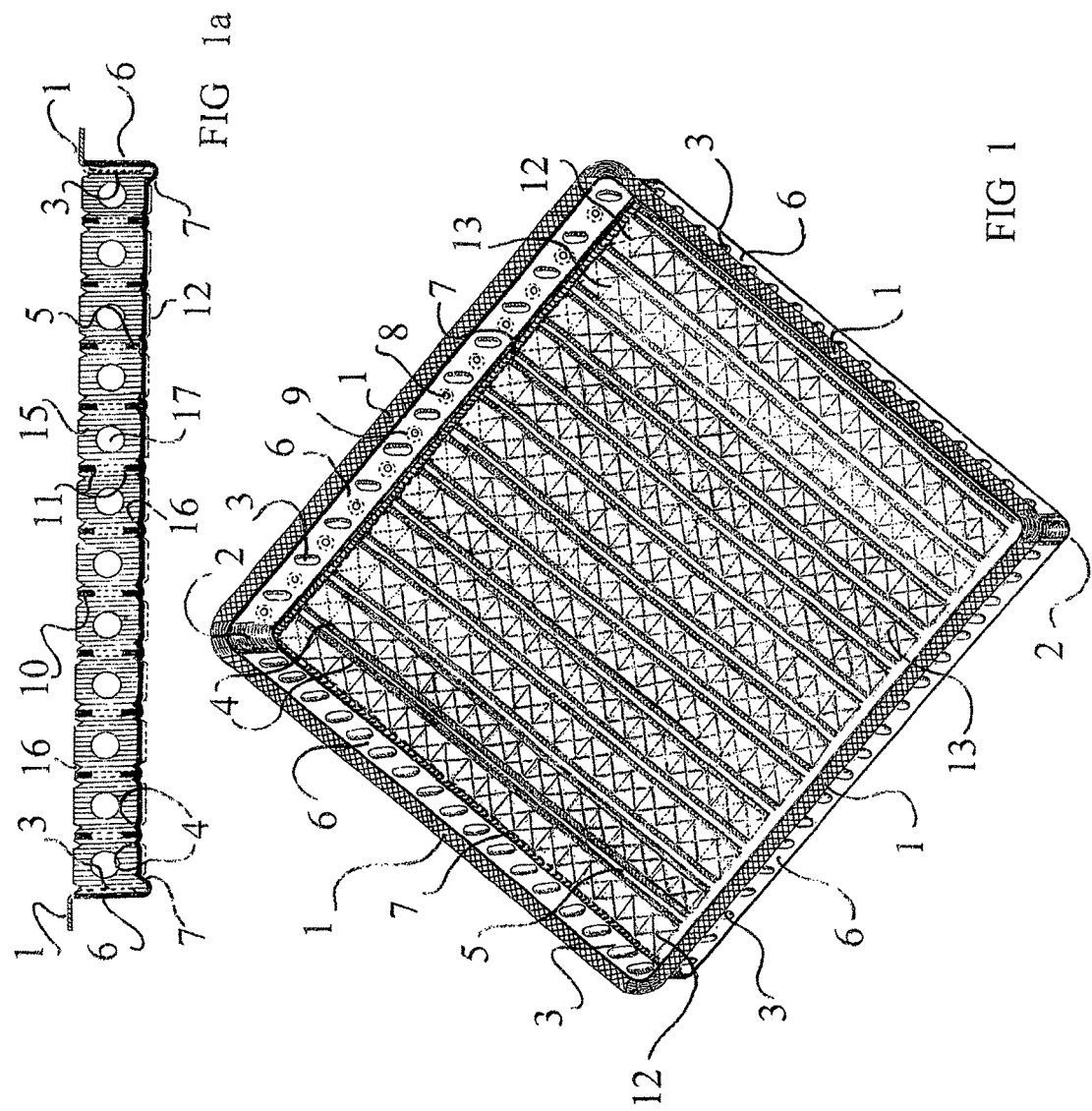
FIG. 1—Orthogonal view—stamped deep drawn interior face of bottom part of VIP panel FIG. 1a—Cross section view through structural supports at one side of bottom part of VIP panel FIG. 2—Orthogonal view—stamped deep drawn exterior face of top part of VIP panel FIG. 2a—Shows "X" design and linear troughs on exterior face of top lid element FIG. 2b—Shows "X" design and linear troughs on interior face of top lid element FIG. 2c—Cross-section depicts interlocking pressure sealing of top and bottom tabs or flanges FIG. 2d—Cross-section view of linear structural design appurtenances holding supports FIG. 2e—Cross-section view through one side of VIP panel showing cruciform supports FIG. 3—Orthogonal view showing structural supports with holes, plastic grid and rubber gasket FIG. 3a—Close-up view of lateral and horizontal cruciform supports with apertures & notches FIG. 4—Orthogonal view showing "X" shaped patterns on top and bottom elements FIG. 4a—Enlarged view showing barrel vault "X" shape & inverted "V" for bottom element FIG. 4b—Enlarged view showing barrel vault "X" shape & inverted "V" for top element FIG. 4c—Enlarged view showing inverted "V" atop of "X" shaped pattern of both elements FIG. 5—Cross-Section through wall assembly from interior to exterior construction elements FIG. 6—Aerial view cross-section through wall assembly-interior to exterior showing elements

1—Perimeter bottom tab or flange which interlocks with top tab or flange of 22
2—Bottom radius typical for all four corners of the bottom element of VIP panel
3—Stamped side interior oval raised relief pattern for structural rigidity of bottom element of VIP panel
4—Continuous linear raised relief for rigidity and to secure vertical structural support of 10
5—Continuous depressed linear trough created by the two lateral raised reliefs of 4
6—One of four sides of bottom element of aluminum VIP panel
7—Bottom continuous perimeter structural inclination which creates a raised foot-like pod
8—Exterior aperture for insertion of vacuum needle for evacuation of air contents
9—Stamped concentric circular depression surrounding aperture to receive sealing disc
12—Stamped "X" shaped depression for structural stability of exterior face of bottom element
13—Horizontal depressed trough which receives structural cross-strut 15 with aperture

FIG. 1a

1—Perimeter bottom tab or flange which interlocks with top tab or flange of 22
3—Stamped side interior oval raised relief pattern for structural rigidity of bottom element of VIP panel
4—Continuous linear raised relief for rigidity and to secure vertical structural support of 10
5—Continuous depressed linear trough created by the two lateral raised reliefs of 4
6—One of four sides of bottom element of aluminum VIP panel
10—Vertical structural support with hole to facilitate evacuation of air and creation of vacuum
11—Aperture for evacuation of air in vertical structural support of 10
12—Stamped "X" shaped depression for structural stability of exterior face of bottom element
15—Horizontal structural cross-strut which fits into 13 and 23
16—"V" notches at top and bottom of structural cross-strut which receive 4 & 18
17—Aperture in horizontal cross-strut of 15 which permits entry of vacuum needle

FIG. 2

18—Continuous linear depressed troughs for rigidity and to secure structural supports of 10

19—Continuous linear raised relief created by the two lateral depressed troughs of 18
20—One of four sealed sides of top element of VIP panel acts as raised platform base (FIG. 5)
21—Stamped "X" shaped raised reliefs for structural rigidity of exterior face of top element
22—Perimeter top tab or flange which interlocks with bottom tab of 1
23—Linear horizontal raised ridge laterally flanking each "X" shape of 21
25—Top radius typical for all four corners of the top element of VIP panel

FIG. 2a

18—Continuous linear depressed troughs for rigidity and to secure structural supports of 10
19—Continuous linear raised relief created by the two lateral depressed troughs of 18
21—Stamped "X" shaped raised reliefs for structural rigidity of exterior face of top element
23—Linear horizontal raised ridge laterally flanking each "X" shape of 21

FIG. 2b

18—Continuous linear depressed troughs for rigidity and to secure structural supports of 10
19—Continuous linear raised relief created by the two lateral depressed troughs of 18
21—Stamped "X" shaped raised reliefs for structural rigidity of exterior face of top element
23—Linear horizontal raised ridge laterally flanking each "X" shape of 21

FIG. 2c

1—Perimeter bottom tab or flange which interlocks with top tab or flange of 22
6—One of four sides of bottom element of aluminum VIP panel
20—One of four sealed sides of top element of VIP panel acts as raised platform base (FIG. 5)
22—Perimeter top tab or flange which interlocks with bottom tab of 1
24—exterior face of top element of VIP panel

FIG. 2d

4—Continuous linear raised relief for rigidity and to secure vertical structural support of 10
5—Continuous depressed linear trough created by the two lateral raised reliefs of 4
10—Vertical structural support with hole to facilitate evacuation of air and creation of vacuum
11—Aperture for evacuation of air in vertical structural support of 10
15—Horizontal structural cross-strut which fits into 13 and 23
17—Aperture in horizontal cross-strut of 15 which permits entry of vacuum needle
18—Continuous linear depressed troughs for rigidity and to secure structural supports of 10
19—Continuous linear raised relief created by the two lateral depressed troughs of 18
24—Exterior face of top element of VIP panel

FIG. 2e

1—Perimeter bottom tab or flange which interlocks with top tab or flange of 22
3—Stamped side interior oval raised relief pattern for structural rigidity of bottom element of VIP panel
6—One of four sides of bottom element of aluminum VIP panel
7—Bottom continuous perimeter structural inclination which creates a raised foot-like pod
10—Vertical structural support with hole to facilitate evacuation of air and creation of vacuum
11—Aperture for evacuation of air in vertical structural support of 10
12—Stamped "X" shaped depression for structural stability of exterior face of bottom element
15—Horizontal structural cross-strut which fits into 13 and 23
17—Aperture in horizontal cross-strut of 15 which permits entry of vacuum needle
18—Continuous linear depressed troughs for rigidity and to secure structural supports of 10
19—Continuous linear raised relief created by the two lateral depressed troughs of 18
20—One of four sealed sides of top element of VIP panel acts as raised platform base (FIG. 5)
21—Stamped "X" shaped raised reliefs for structural rigidity of exterior face of top element
22—Perimeter top tab or flange which interlocks with bottom tab of 1
23—Linear horizontal raised ridge laterally flanking each "X" shape of 21
24—Exterior face of top element of VIP panel
26—Interior face of top element which demonstrates underside pattern shown in FIG. 2b

FIG. 3

2—Bottom radius typical for all four corners of the bottom element of VIP panel
6—One of four sides of bottom element of aluminum VIP panel
8—Exterior most aperture for insertion of vacuum needle for evacuation of air contents
9—Stamped concentric circular depression surrounding aperture to receive sealing disc
10—Vertical structural support with hole to facilitate evacuation of air and creation of vacuum
11—Aperture for evacuation of air in vertical structural support of 10
15—Horizontal structural cross-strut which fits into 13 and 23
17—Aperture in horizontal cross-strut of 15 which permits entry of vacuum needle
27—Inserted needle through 17 aperture for vacuum pump to evacuate air in VIP
28—High impact resistant plastic pressure bar with serial apertures for insertion of needles
29—Compressible rubber gasket which seals exterior apertures from entry of outside air
30—Serial apertures stamped into high impact pressure bar for entry of vacuum needle

FIG. 3a

10—Vertical structural support with hole to facilitate evacuation of air and creation of vacuum 11—Aperture for evacuation of air in vertical structural support of 10
15—Horizontal structural cross-strut which fits into 13 and 23
16—"V" notches at top and bottom of structural cross-strut which receive 4 & 18
17—Aperture in horizontal cross-strut of 15 which permits entry of vacuum needle
27—Inserted needle through 17 apertures for vacuum pump to evacuate air in VIP

FIG. 4

Figure 4:
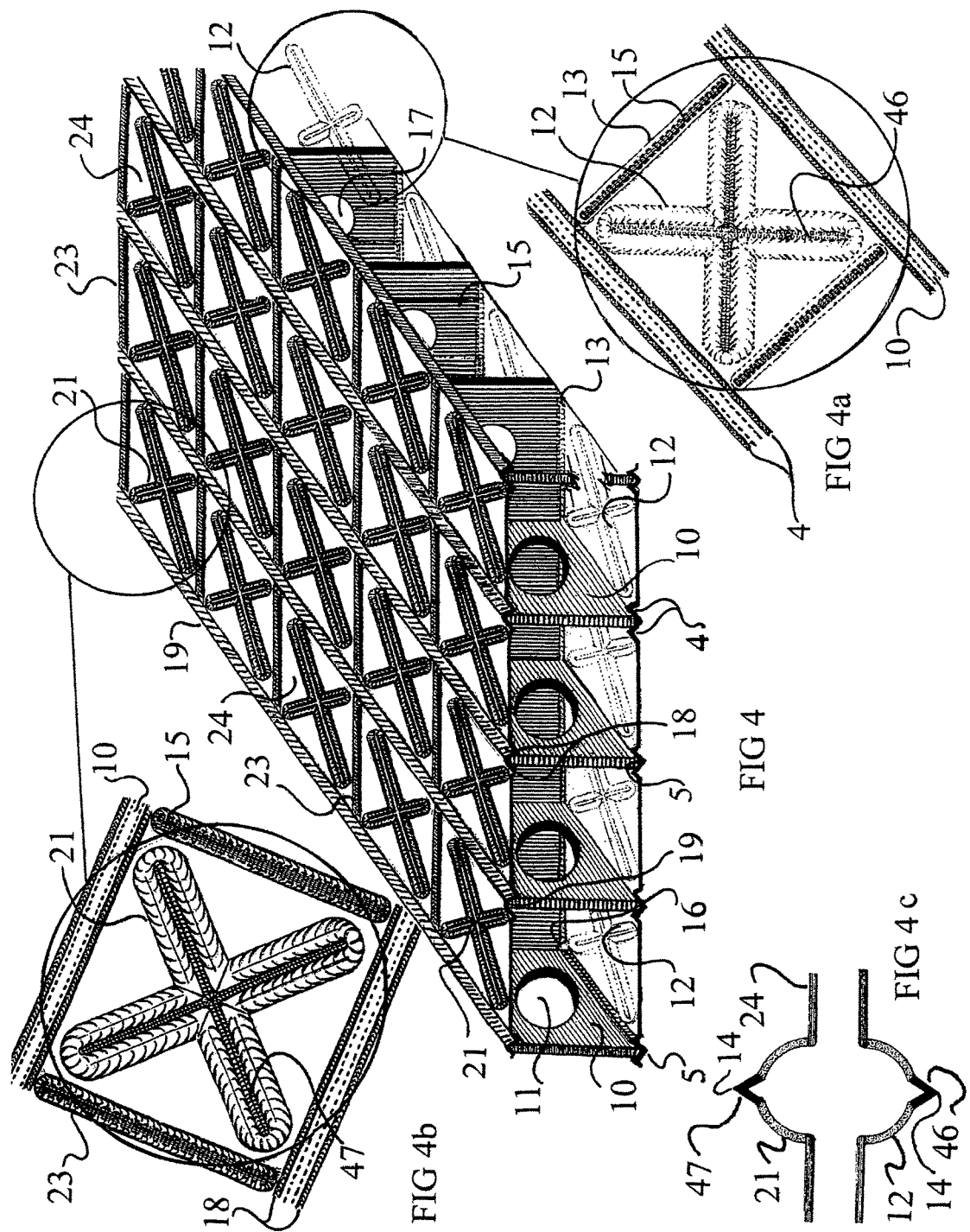

4—Continuous linear raised relief for rigidity and to secure vertical structural support of 10
5—Continuous depressed linear trough created by the two lateral raised reliefs of 4
10—Vertical structural support with hole to facilitate evacuation of air and creation of vacuum
11—Aperture for evacuation of air in vertical structural support of 10
12—Stamped "X" shaped depression for structural stability of exterior face of bottom element
13—Horizontal depressed trough which receives structural cross-strut 15 with aperture
15—Horizontal structural cross-strut which fits into 13 and 23
16—"V" notches at top and bottom of structural cross-strut which receive 4 & 18
17—Aperture in horizontal cross-strut of 15 which permits entry of vacuum needle
18—Continuous linear depressed troughs for rigidity and to secure structural supports of 10
19—Continuous linear raised relief created by the two lateral depressed troughs of 18
21—Stamped "X" shaped raised reliefs for structural rigidity of exterior face of top element
23—Linear horizontal raised ridge laterally flanking each "X" shape of 21
24—exterior face of top element of VIP panel FIG. 4*a*

4—Continuous linear raised relief for rigidity and to secure vertical structural support of 10
10—Vertical structural support with hole to facilitate evacuation of air and creation of vacuum
12—Stamped "X" shaped depression for structural stability of exterior face of bottom element
13—Horizontal depressed trough which receives structural cross-strut 15 with aperture
15—Horizontal structural cross-strut which fits into 13 and 23
46—Bottom inverted "V" shaped structural element above 12 on face of bottom element FIG. 4*b*

10—Vertical structural support with hole to facilitate evacuation of air and creation of vacuum
15—Horizontal structural cross-strut which fits into 13 and 23
18—Continuous linear depressed troughs for rigidity and to secure structural supports of 10
21—Stamped "X" shaped raised reliefs for structural rigidity of exterior face of top element
23—Linear horizontal raised ridge laterally flanking each "X" shape of 21
47—Top inverted "V" shaped structural element above 21 on face of top element FIG. 4*c*

12—Stamped "X" shaped depression for structural stability of exterior face of bottom element
14—Apex of 46 and 47
21—Stamped "X" shaped raised reliefs for structural rigidity of exterior face of top element
24—Exterior face of top element of VIP panel
46—Bottom inverted "V" shaped structural element above 12 on face of bottom element
47—Top inverted "V" shaped structural element above 21 on face of top element

FIG. 5

10—Vertical structural support with hole to facilitate evacuation of air and creation of vacuum
11—Aperture for evacuation of air in vertical structural support of 10
15—Horizontal structural cross-strut which fits into 13 and 23
17—Aperture in horizontal cross-strut of 15 which permits entry of vacuum needle
20—One of four sealed sides of top element of VIP panel acts as raised platform base (FIG. 5)
31—2×4 wood stud attachment screw for securing 34 VIP carrier to 42
32—Thin film of trapped air acting as an abetting insulation medium
33—VIP vacuum panel which is the subject of this invention
34—Plastic extruded carrier channel for securing the VIP panel in its proper orientation
35—Wooden ground attached to VIP panel plastic carrier
36—Several layers of many small segmented air pockets in polyethylene bubble wrap
37—Wood ground attachment screw for securing of 35 to 34 VIP plastic carrier
38—Gypsum sheathing screw for securing external gypsum 39 to wood ground of 35
39—Fiberglass matt gypsum sheathing as an exterior air and water resistant barrier
40—Exterior siding or building cladding
41—Building's interior sheetrock gypsum wall board
42—Building's load bearing 2×4 wooden stud
43—Building's fiberglass batt-insulation trapping air with R-13 value
44—Building's exterior plywood sheathing CDX grade
45—Building's 15 lb. asphalt impregnated waterproof tar paper

FIG. 6

Figure 5:
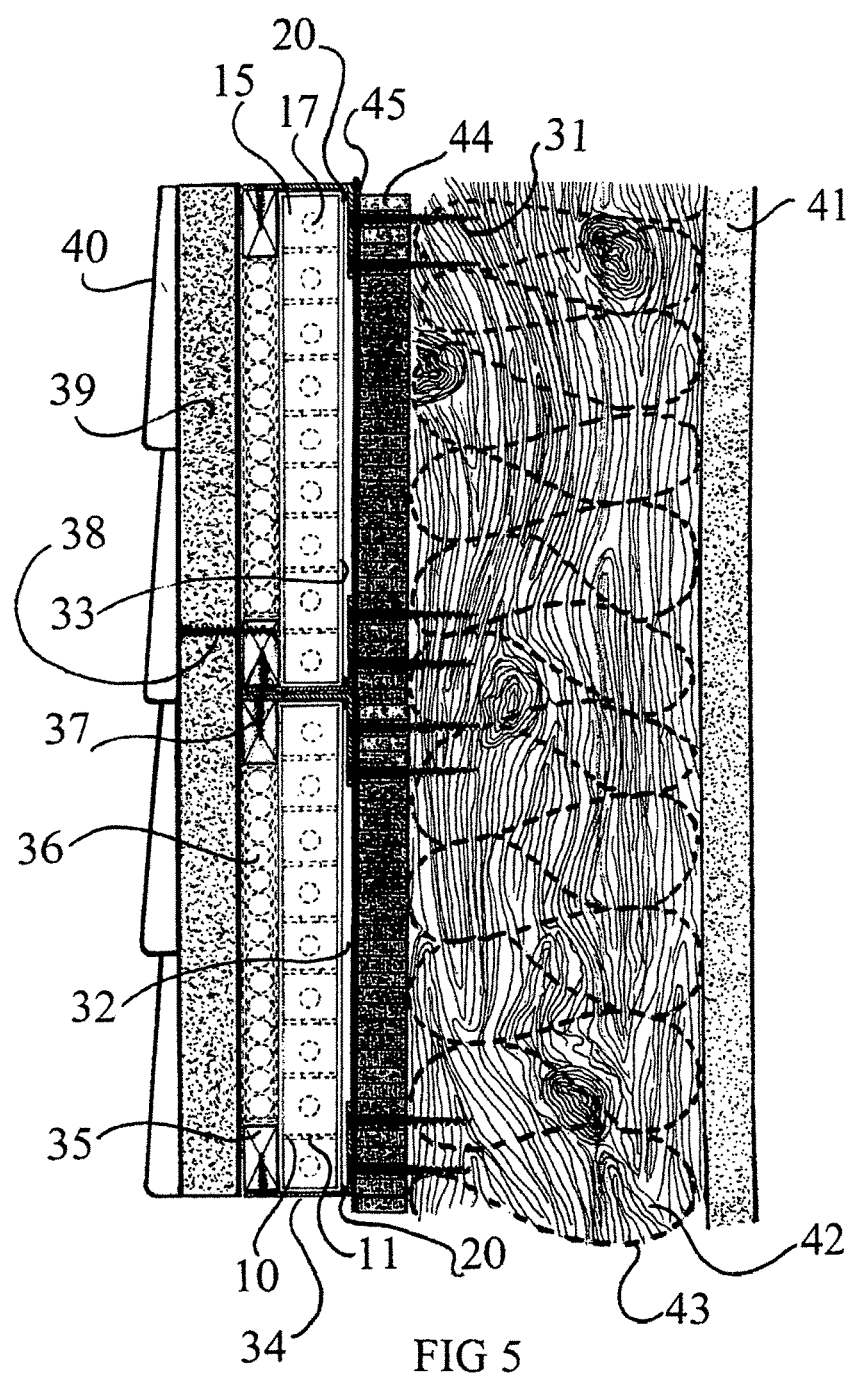

10—Vertical structural support with hole to facilitate evacuation of air and creation of vacuum
11—Aperture for evacuation of air in vertical structural support of 10
15—Horizontal structural cross-strut which fits into 13 and 23
17—Aperture in horizontal cross-strut of 15 which permits entry of vacuum needle
20—One of four sealed sides of top element of VIP panel acts as raised platform base (FIG. 5)

32—Thin film of trapped air acting as an insulation medium
33—VIP vacuum panel which is the subject of this invention
34—Plastic extruded carrier channel for securing the VIP panel in its proper orientation
35—Wooden ground attached to VIP panel plastic carrier
36—Several layers of many small segmented air pockets in polyethylene bubble wrap
39—Fiberglass matt gypsum sheathing as an exterior air and water resistant barrier
40—Exterior siding or building cladding
41—Building's interior sheetrock gypsum wall board
42—Building's load bearing 2×4 wooden stud
43—Building's fiberglass batt-insulation trapping air with R-13 value
44—Building's exterior plywood sheathing CDX grade
45—Building's 15 lb. asphalt impregnated waterproof tar paper

DETAILED DESCRIPTION—ALTERNATE EMBODIMENT

The Manufacturing Process

Figure 2:
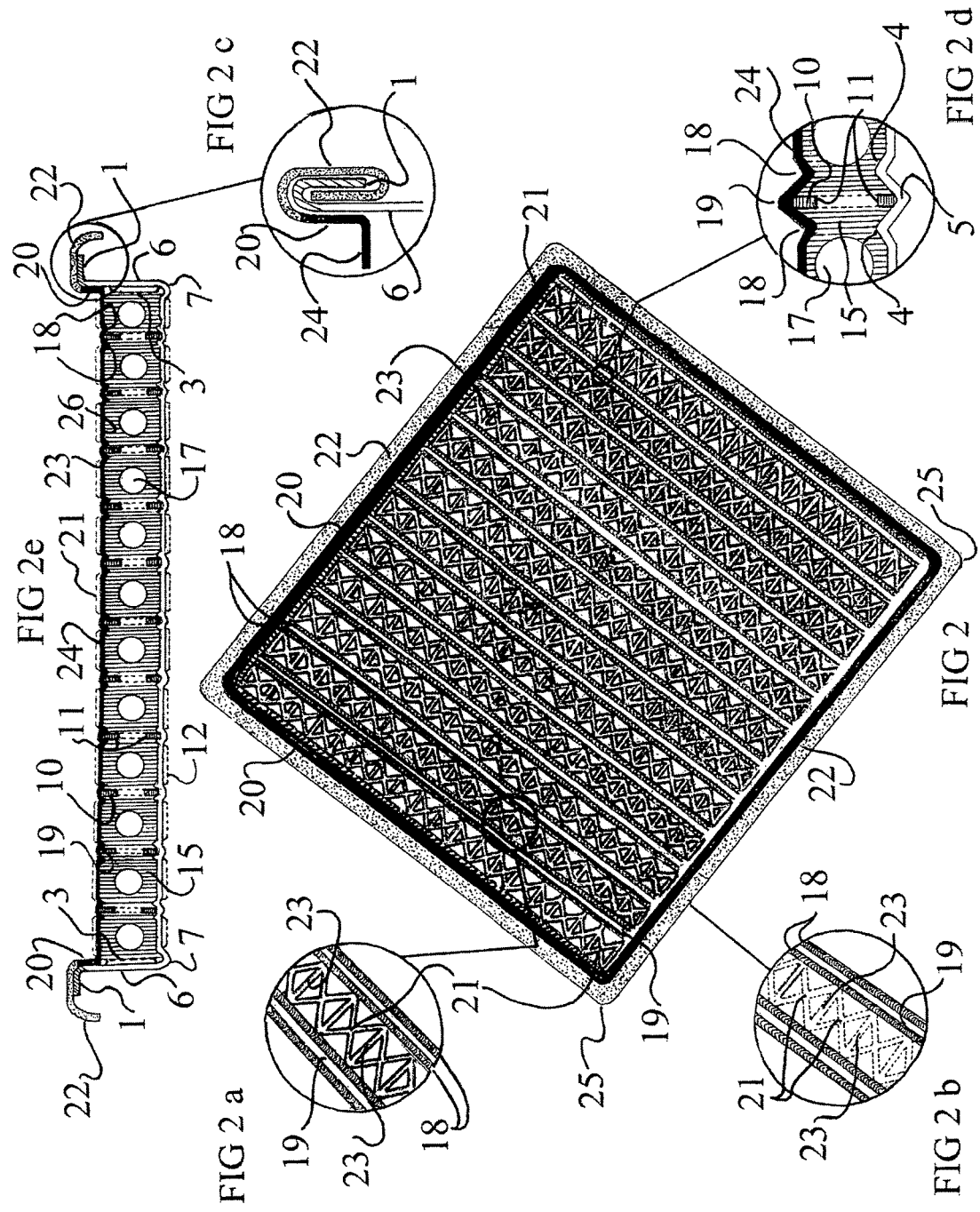

Both the bottom element, or graphically drawn interior face of FIG. 1 and the top element or graphically drawn exterior face of FIG. 2 of this vacuum apparatus are formed through the manufacturing process of sheet metal stamping using the deep drawn die process. Sheet metal stamping presses and stamping tool dies are manufacturing tools used to produce these high volume sheet metal bottom and top elements. Both of these separate elements achieve their shape through the effects of the die tooling; whereby both an upper male tool die and an underlying lower female tool die component, in combination, stamp out each bottom element and each top element undergoing separate operational steps.

This production stamping is generally performed on materials 0.020" to 0.080" thick. The resulting design thus comes about when the upper male tool die face strikes the underlying female tool die face, and said mating process is accompanied with a sheet metal blank of aluminum or tin in between the top male tool die face and the bottom female tool die face. Therefore, most of the reference characters of the bottom element shown in FIG. 1 and the top element shown in FIG. 2 are achieved through the process of formability, which is the primary attribute of sheet metal material. Formability is further defined as the materials ability to be: bent, stretched, and deep drawn. The metallurgical term for these qualities is "ductility". Ductility is the materials ability to deform and elongate without fracture. The extent to which a stamping is subjected to such deformation is directly related to the element's overall shape and geometry. Other factors also influence the material's formability. They include: the die design; the press; the press speed; lubrication; sheet metal feeding mechanisms; monitoring and control systems.

The shape of both the bottom and top elements of this article of manufacture, as well as the various reference character's design features in either raised relief or within the shallow depressions on each face are formed through this "ductility" deformation by use of these metal stamping dies. The word "die" is a generic term used to describe the tooling used to produce the stamped elements. A die set assembly consisting of an upper male punch and lower female die cavity component are the actual tools that produce the shaped stamping designs. The upper male and lower female components work in opposition to both form and punch these design patterns in the blank stock. The upper half of the die set, which usually is the male, is on the press ram and delivers the stroke action. The lower half, usually the female, is attached to an intermediate bolster plate which in turn is secured to the press bed. Guide pins are used to insure alignment between the upper male and lower female halves of each die set.

At the initial stage of this deep drawn process, a square blank is cut first. The most common types of dies perform either cutting and forming. Cutting dies are used to shear sheet material into what is called a blank. These blanks are then exposed to blanking dies which cut the entire perimeter of the part, or to forming dies where the blank is stamped into the design element shown in FIGS. 1 & 2. Punching is another function of cutting dies. Punching is the cutting of a slug from the sheet metal stock to produce a hole or slot. Cutting dies are also used to trim excess metal from around a formed part. Hole punching and other cutting operations require specific and carefully maintained clearances between the punch (male component) and the die cavity (female component). The setting of the required clearances is determined by both the stock thickness and temper. In general, die clearances increase as the stock thickness increases. The depth of punch penetration into the sheet metal stock will also increase as softer stock is used. Forming is a general term used to describe a stamped element whose shape and contour is reproduced directly from the shape and contour of a die set. The main forming operations accomplished with press mounted dies are: drawing; bending; flanging; and hemming.

Drawing, or deep draw forming, involves forcing a blank deeply into the underlying lower female die cavity and shaping it into the shallow pan shape depicted within FIG. 1 and the contour facets of the punch face and sides. Without sufficient formability qualities, drawn blanks are subject to wrinkling, thinning, and fracturing. Draw forming requires an addition to the die set called a blank-holder. The function of the blank-holder, usually a ring through which the punch and ram pass, is to control the metal flow as it is forced into the die cavity. In practice, the blank-holder must exert less pressure against the blank than the punch, so metal can flow into the die cavity; yet it must exert enough pressure to prevent the material from wrinkling. The best illustration of this process is the following analogy for the reader. Picture yourself making an open cup-shaped scoop with your left hand. Next, place an 8½"×11" piece of paper over your left hand. Then make a fist with your right hand and punch that fist into your left hand. The paper will conform to the shape of your left hand; but you will see the outlines of your fingers from your right hand in the paper.

Bending is a relatively simple forming operation which provides rigidity and shape to sheet metal parts.

Flanging: a flange or tab as shown in FIGS. 1 & 2, under the perimeter bottom tab or flange which interlocks with top tab or flange of 22-1 and the perimeter top tab or flange which interlocks with bottom tab of 1-22 respectively and is significantly smaller in dimension than the rest of the part. The functions of a flange include: giving the finished apparatus a more finished appearance; rigidity; edge strengthening; providing a fastening or attachment surface.

Hemming—as shown in FIG. 2c is the folding over of both the perimeter bottom tab or flange which interlocks with top tab or flange of 22-1 and the perimeter top tab or flange which interlocks with bottom tab of 1-22, which are short flanges, folded upon each other to form a raised perimeter lip with rounded edge which facilitates the attachment of both mating parts. Multiple stamping operations may be performed within a single die, or at a number of die stations within a die set and with a single stroke of the press. Single station dies can be either compound dies or combinations dies. A compound die performs basic cutting operations such as blanking and hole punching to produce parts. Combination dies combine shaping and forming functions with cutting operation to manufacture parts.

The resistance of the sheet metal stock to the forces exerted by the moving dies creates friction. For this reason, lubrication is vital for successful sheet metal forming. A lubrication's function is to minimize contact between the tooling and the work piece. This results in reduced tonnage requirements, longer tooling life, and improved product quality. Lubricants range from light mineral oils to high viscosity drawing compounds. They may be oil base, water soluble, or synthetic materials. These lubricants may be applied in a variety of ways, including: manually by roller or brush; drip; machine roller; spraying; or flooding.

Die making is as much of an art as a science. When all the dynamics of stamping are taken into account, the resulting part may not meet all expectations. To help fine tune the stamping process and finalize die design, die makers use an analytical tool called Circle Grid Analysis, or CGA. The application of CGA involves the etching of a pattern of small circles on the surface of the blank. This pattern deforms along with the blank as it is formed, providing point-to-point calculations of the deformation that occurred. Analyzing this stamped grid pattern suggests the location and type of rework that must be performed on the dies to produce easily manufactured parts. The CGA process is repeated on the die until an acceptable part is produced.

Hereinafter, the abbreviation for all reference characters mentioned within the body of this detailed description shall be cited simply as an alphanumeric reference number preceded by the specific name of the part being identified. Therefore, as described herein, another embodiment of this invention; solely with regard to its various components and assembly begins with the formation of the bottom part of the VIP vacuum vessel under Claim 7 with the stamping out of a thin sheet of malleable metal. Thus, this embodiment begins as a deep drawn manufacturing sheet metal forming process, in which a thin square sheet metal work piece called a blank, is radially drawn into a hollow forming female die cavity by the mechanical action of a male die punch. It is therefore a shape transformation process with material retention. The upper male punch travels toward the metal blank. After contacting the work piece, the punch thus forces the sheet metal into the lower female die cavity, forming its structural shape. Pressure pads create the force which holds the metal sheet material tight against the female die cavity for the downward pressure of the male die punch's force.

Bottom Element

In order to form a thorough understanding of how the various design features of the bottom FIG. 1 and top elements FIG. 2 are formed through this stamping process, it is essential that the reader comprehend the fabrication of the individual complementary and opposite design facets on both the upper male die punch, hereinafter referred to as BUM (bottom upper male) and the lower female die cavity, hereinafter referred to as BLF (bottom lower female). Therefore, it must be understood that where it appears in FIG. 1 that the "X" shaped design of stamped "X" shaped depression for structural stability of exterior face of bottom element—12 is in fact an "X" shaped shallow depression appearing on the interior face of the bottom element; this feature comes about as follows. The BUM thus stamps that feature with an "X" shaped raised relief on its punch face; whereas the BLF has equal and opposite aligned facets appearing on its face as "X" shaped shallow depressions. Hence, the BUM forces the aluminum blank material into the shallow depression of the BLF with a resulting "X" shaped raised relief only on the exterior face of the bottom element as shown in FIG. 1a as the stamped "X" shaped depression for structural stability of exterior face of bottom element—12. It is noteworthy to point out that said stamped "X" shaped depression for structural stability of exterior face of bottom element—12 has a distinct additional "X" shaped cruciform feature incorporated on its exterior face apex as an inverted "V" shaped raised ridge protruding above the barrel-vault structure of the stamped "X" shaped depression for structural stability of exterior face of bottom element—12 which is shown graphically in FIG. 4a as the bottom inverted "V" shaped structural element above 12 on face of bottom element—46 which is on the interior face. Therefore, it must be understood that in FIG. 4a, the stamped "X" shaped depression for structural stability of exterior face of bottom element—12 instead appears as a concave depression similar to an inverted cruciform barrel-vault structure which is shown on the interior face of the bottom element. Whereas, the inverted "V" shaped structural element above 12 on face of bottom element—46 is formed as an additional cruciform linear depression at the very nadir of that "X" shaped barrel-vault of said stamped "X" shaped depression for structural stability of exterior face of bottom element—12; however only with respect to the interior face, as it appears within that drawing of FIG. 4a. Instead, on the exterior face of the bottom element, the opposite characteristics are produced, in which the exterior face of the stamped "X" shaped depression for structural stability of exterior face of bottom element—12 appears as an "X" shaped convex barrel-vault above the planar surface of the exterior face as shown by said stamped "X" shaped depression for structural stability of exterior face of bottom element—12 in FIG. 1a. Moreover, the bottom inverted "V" shaped structural element above 12 on face of bottom element—46 appears on the exterior face of the bottom element as an "X" shaped linear raised ridge, above and at the apex of the barrel-vault of the stamped "X" shaped depression for structural stability of exterior face of bottom element—12. For a clearer understanding the reader is referred to FIG. 4c. Later discussions will reveal the structural purpose of these two separate and distinct characteristics.

In a very much similar manner, the horizontal depressed trough which receives structural cross-strut 15 with aperture—13 shown in FIG. 1 appears as a short linear shallow depression located in front of and behind the stamped "X" shaped depression for structural stability of exterior face of bottom element—12 of that bottom element on its interior face; thus alternating from one dual continuous linear raised relief for rigidity and to secure vertical structural support of 10-4 to the next dual continuous linear raised relief for rigidity and to secure vertical structural support of 10-4. Accordingly, borrowing from the same aforementioned procedure explained above, the BUM stamps that feature with a linear raised relief on its punch face; whereas the underlying BLF has an equal and opposite aligned facet appearing on its face as short linear shallow depressions. Hence, the BUM forces the aluminum blank material into the shallow short linear depressions of the BLF die cavity with a resulting linear raised relief on the exterior face of the bottom element, thus understood to be in front of, and in back of every stamped "X" shaped depression for structural stability of exterior face of bottom element—12 of FIG. 1 and FIG. 1*a*.

Next, in a very much similar manner, the continuous depressed linear trough created by the two lateral raised reliefs of 4-5 shown in FIG. 1 appears as a long linear shallow depression from one side of that bottom element on its interior face, to the complete opposite end of said bottom element. Thus, borrowing from the same aforementioned procedure explained above, the BUM stamps that feature with a linear raised relief on its punch face; whereas the underlying BLF has equal and opposite aligned facets appearing on its face as continuous linear shallow depressions. Therefore, the BUM forces the aluminum blank material into the continuous shallow linear depression of the BLF die cavity with a resulting long linear raised reliefs on the exterior face of the bottom element as shown in FIG. 1*a* for the continuous depressed linear trough created by the two lateral raised reliefs of 4-5.

It must be understood that the creation of the aforementioned continuous shallow linear depression, or trough of said continuous depressed linear trough created by the two lateral raised reliefs of 4-5 is produced and augmented by the simultaneous creation of the two long linear, laterally flanking raised projections coursing the entire length of said continuous depressed linear trough created by the two lateral raised reliefs of 4-5; thus graphically shown under FIG. 1 as the continuous linear raised relief for rigidity and to secure vertical structural support of 10-4. In essence, the complete opposite process which created the continuous depressed linear trough created by the two lateral raised reliefs of 4-5 is employed to create the continuous linear raised relief for rigidity and to secure vertical structural support of 10-4. Accordingly, the BUM creates that feature with its side-by-side dual shallow linear depressions on its punch face; whereas the BLF has equal and opposite aligned facets appearing as side-by-side dual raised projections. Hence, the raised projections of the BLF force the aluminum blank material into the shallow depressions of the BUM with resulting dual side-by-side raised relief projections flanking the linear trough of the continuous depressed linear trough created by the two lateral raised reliefs of 4-5 as shown on the interior face of the bottom element, thus graphically depicted in FIG. 1*a*, as dual, continuous linear raised relief for rigidity and to secure vertical structural support of 10-4.

Next, and also in a somewhat similar manner to the above, the entire outer perimeter of FIG. 1 is circumscribed with a continuous, four-sided substantive angular trough, which when formed, creates a raised pedestal or platform for the entire bottom element as shown in FIG. 1*a* as the bottom continuous perimeter structural inclination which creates a raised foot-like pod—7; . . . the creation of which comes about as follows. The BUM contains on its face a continuous, four-sided substantive angular protuberance; whereas the BLF has an equally sized and opposing facet appearing as a continuous, four-sided substantive trough. By and large, the BUM facet projection forces the aluminum blank material into the latter trough of the underlying BLF; thus creating the raised platform circumscribed border pedestal as shown in FIG. 1*a* as the bottom continuous perimeter structural inclination which creates a raised foot-like pod—7.

The creation of one of four sides of bottom element of aluminum VIP panel—6 in FIG. 1 is best illustrated via the analogy of the 8½×11 piece of paper placed in one's cupped left hand, while the right hand forms a tight fist and punches the paper into the contours of the left hand. The run-up of paper along the fingers creates a tray-like form. Analogously, the BUM appears as a bulky four-sided punch which rams the underlying tray-like cavity of the BLF; thus forcing blank aluminum material to flow into the tray below, while simultaneously creating a shallow bottom tray with four equal sides appearing as upright walls as shown in FIG. 1*a*, one of four sides of bottom element of aluminum VIP panel—6.

Of course it is expressly understood that while the bottom element of FIG. 1 appears as a square, having four equal sides, its unique design intent incorporates not the usual and customary right angle corners of a typical square; but instead the critical design feature of four corner radii, which allow blank aluminum material to easily flow into the underlying female die cavity BLF. Thus, the four corners of the BUM and the four corners of the BLF have their respective upper and lower faces with four radii each fabricated into their design tooling. These four facets are graphically shown in FIG. 1 as the bottom radius typical for all four corners of the bottom element of VIP panel—2.

It must also be understood that the creation of the eight design facets indicated as the bottom radius typical for all four corners of the bottom element of VIP panel—2; the continuous linear raised relief for rigidity and to secure vertical structural support of 10—4; the continuous depressed linear trough created by the two lateral raised reliefs of 4-5; one of four sides of bottom element of aluminum VIP panel—6; the bottom continuous perimeter structural inclination which creates a raised foot-like pod—7; stamped "X" shaped depression for structural stability of exterior face of bottom element—12; horizontal depressed trough which receives structural cross-strut 15 with aperture—13 and bottom inverted "V" shaped structural element above 12 on face of bottom element—46 all occur rather simultaneously with one downward stroke of the BUM hitting the underlying BLF in a single operation. In other words, one singular stroke of the BUM creates eight complete design features all at once. However, it must be understood that the entire perimeter distal end of one of four sides of bottom element of aluminum VIP panel—6 has a flange attached to it which subsequently orients itself at right angles to the latter. That flange is shown as the perimeter bottom tab or flange which interlocks with top tab or flange of 22-1 in FIG. 1 and FIG. 1*a*; and presents as a continuous perimeter tab or flange, which is bent at right angles in the next subsequent operation.

Subsequently, while the bulky BUM ram punch creates one of four sides of bottom element of aluminum VIP panel—6 shown in FIG. 1; its three sides have alternating oval depressions stamped into each side face. Therefore, while the BUM is held temporarily paused; thus having completed its full downward stroke; three other side rams, each with raised oval projections, punch their impressions at right angles and perpendicular to the BUM; of course with the underlying BLF removed. Thus, all formed ovals of stamped side interior oval raised relief pattern for structural rigidity of bottom element of VIP panel—3 project into the interior compartment of the bottom element; which is graphically shown in FIG. 1*a* as stamped side interior oval raised relief for structural rigidity of bottom element of VIP panel—3 and also in FIG. 1 as stamped side interior oval raised relief for structural rigidity of bottom element of VIP panel—3. The reader must be mindful that while one of four sides of bottom element of aluminum VIP panel—6 represents a pre-determined height, the three side rams which are utilized to form the stamped side interior oval raised relief pattern for structural rigidity of bottom element of VIP panel—3, are in fact at that same pre-determined height. Therefore, before the stamped side interior oval raised relief pattern for structural rigidity of bottom element of VIP panel—3 are completed, four over-head dies fold over and bend the distal ends of one of four sides of bottom element of aluminum VIP panel—6 which automatically creates the continuous perimeter flange or tab of the perimeter bottom tab or flange which interlocks with top tab or flange of 22-1.

The only slight variation that occurs with one of the side rams is that only one side ram contains an additional feature which alternates with the stamped side interior oval raised relief pattern for structural rigidity of bottom element of VIP panel—3 pattern. That feature is best illustrated by the stamped concentric circular depression surrounding aperture to receive sealing disc—9 which are a series of small circular depressions stamped into that lone singular side. Therefore, the side ram understandably contains a raised circular facet, while the BLF has a depressed circular facet on its respective side This resulting feature is shown in FIG. 1 as the stamped concentric circular depression surrounding aperture to receive sealing disc—9. Afterward, that side ram is removed and instead a punch ram cuts a concentric circular hole in the direct center of the stamped concentric circular depression surrounding aperture to receive sealing disc—9 which is graphically shown in FIG. 1 as exterior aperture for insertion of vacuum needle for evacuation of air contents—8.

Top Element

The upper element is shown graphically as FIG. 2. Essentially, most of the reference characters, or features within FIG. 2 are identical to FIG. 1. However, it must be understood that the view shown in FIG. 2 depicts the exterior face of the upper element, whereas instead, the view shown in FIG. 1 depicts the interior face of the bottom element. Accordingly, all of the following descriptions for producing the exterior elements of FIG. 2 have equal and opposite facets on both the top upper male TUM die punch and top lower female TLF die cavity.

Therefore, it must be understood as it appears in FIG. 2 that the "X" shaped design of the stamped "X" shaped raised reliefs for structural rigidity of exterior face of top element—21 are in fact an "X" shaped raised reliefs appearing on the exterior face of the top element; whereby these features come about as follows. The TUM thus helps stamp that feature with an "X" shaped shallow depression on its punch face; whereas the TLF has an equal and opposite aligned facet appearing on its face as an "X" shaped raised relief. Hence, the TLF forces the aluminum blank material into the shallow depression of the TUM with a resulting "X" shaped raised relief on the exterior face of the top element as shown in FIG. 2a, as the stamped "X" shaped raised reliefs for structural rigidity of exterior face of top element—21. It is noteworthy to point out that the stamped "X" shaped raised reliefs for structural rigidity of exterior face of top element—21 has a distinct additional "X" shaped cruciform feature incorporated on its exterior facial apex as a raised ridge protruding above that barrel-vault structure of the stamped "X" shaped raised reliefs for structural rigidity of exterior face of top element—21 which is graphically shown in FIGS. 4b and 4c as the top inverted "V" shaped structural element above 21 on face of top element—47. It must be understood that in FIGS. 4b and 4c, the stamped "X" shaped raised reliefs for structural rigidity of exterior face of top element—21 appears convex, thus rising above its planar surface similar to a cruciform barrel-vault structure which is on the exterior face of the top element. Whereas, the top inverted "V" shaped structural element above 21 on face of top element—47 is formed as an additional cruciform linear "V" shaped raised ridge at the very apex of that "X" shaped barrel-vault of the stamped "X" shaped raised reliefs for structural rigidity of exterior face of top element—21; however only with respect to the exterior face. Instead, on the interior face of the top element, the opposite characteristics are produced, in which the stamped "X" shaped raised reliefs for structural rigidity of exterior face of top element—21 appears as an "X" shaped concave barrel-vault below the planar surface of the exterior face as shown by the stamped "X" shaped raised reliefs for structural rigidity of exterior face of top element—21 in FIG. 2b. Moreover, the top inverted "V" shaped structural element above 21 on face of top element—47 appears as an "X" shaped linear raised ridge, above and at the apex of the barrel-vault of the stamped "X" shaped raised reliefs for structural rigidity of exterior face of top element—21. See FIG. 4c for further clarification. Later discussions will reveal the structural purpose of these characteristics.

In a very much similar manner, the linear horizontal raised ridge laterally flanking each "X" shape of 21-23 shown in FIG. 2 appears as a short linear raised relief located in front of and behind each stamped "X" shaped raised reliefs for structural rigidity of exterior face of top element—21 of that top element on its exterior face; thus alternating from one dual continuous linear depressed troughs for rigidity and to secure structural supports of 10-18 to the next dual continuous linear depressed troughs for rigidity and to secure structural supports of 10-18; See FIG. 2a. Accordingly, borrowing from the same aforementioned procedure explained above, the TUM stamps that feature of the linear horizontal raised ridge laterally flanking each "X" shape of 21-23 with a short linear shallow depression on its punch face; whereas the underlying TLF has an equal and opposite aligned facet appearing on its face as a short linear raised relief.

Hence, the TLF forces the aluminum blank material into the shallow short linear depressions of the TUM die cavity with a resulting linear raised relief on the exterior face of the top element, thus understood to be in front of, and in back of each stamped "X" shaped raised reliefs for structural rigidity of exterior face of top element—21 of FIG. 2e and FIG. 2a.

Next, in a very much similar manner, the continuous linear raised relief created by the two lateral depressed troughs of 18-19 shown in FIG. 2 appears as a rather long linear raised relief from one side of that top element on its exterior face, to the complete opposite end of said top element. Thus, borrowing from the same aforementioned procedure explained above, the TUM stamps that feature with a long linear shallow depression on its punch face; whereas the underlying TLF has an equal and opposite aligned facet appearing on its face as a continuous long linear raised relief. Therefore, the TLF forces the aluminum blank material into the long continuous shallow linear depression of the TUM die cavity with a resulting long linear raised relief on the exterior face of the top element as shown in FIG. 2e as the continuous linear raised relief created by the two lateral depressed troughs of 18-19.

It must be understood that the creation of the aforementioned continuous long linear raised relief of said continuous linear raised relief created by the two lateral depressed troughs of 18—19 is produced and augmented by the simultaneous creation of the two long linear, laterally flanking shallow depressions coursing the entire length of said continuous linear raised relief created by the two lateral depressed troughs of 18—19; thus graphically shown under FIG. 2 as the continuous linear depressed troughs for rigidity and to secure structural supports of 10—18. In essence, the complete opposite process which created the continuous linear raised relief created by the two lateral depressed troughs of 18—19 is employed to create the dual—the continuous linear depressed troughs for rigidity and to secure structural supports of -10-18. Accordingly, the TUM creates that feature with its side-by-side dual long linear raised reliefs on its punch face; whereas the TLF has equal and opposite aligned facets appearing as side-by-side dual long shallow depressions. Hence, the raised projections of the TUM force the aluminum blank material into the shallow depressions of the TLF with resulting dual side-by-side concavities flanking the linear projection of the continuous linear raised relief created by the two lateral depressed troughs of 18-19 as shown on the exterior face of the top element, thus graphically depicted in FIG. 2e as the continuous linear depressed troughs for rigidity and to secure structural supports of 10-18.

The creation of one of four sealed sides of top element of VIP panel acts as raised platform base (FIG. 5)—20 in FIG. 2 is best illustrated via the analogy of the 8½×11 piece of paper placed in one's cupped left hand, while the right hand forms a tight fist and punches the paper into the contours of the left hand. The run-up of paper along the fingers creates a tray-like form. Analogously, the TUM appears as a four-sided punch which rams the underlying tray-like cavity of the TUF; thus forcing blank aluminum material to flow into the tray below, while simultaneously creating a shallow top lid-like tray cover with four equal sides appearing as very shallow upright walls as shown in FIG. 2e; one of four sealed sides of top element of VIP panel acts as raised platform base (FIG. 5)—20.

Of course it is expressly understood that while the top element of FIG. 2 appears as a square, having four equal sides, its unique design intent incorporates not the usual and customary right angle corners of a typical square; but instead the critical design feature of four corner radii, which allow blank aluminum material to easily flow into the underlying female die cavity TLF. Thus, the four corners of the TUM and the four corners of the TUF have their respective upper and lower faces with four radii each fabricated into their design tooling. These four design features are graphically shown in FIG. 2 as the top radius typical for all four corners of the top element of VIP panel—25.

It must also be understood that the creation of the seven facets indicated as the top radius typical for all four corners of the top element of VIP panel—25; the continuous linear raised relief created by the two lateral depressed troughs of 18-19; the continuous linear depressed troughs for rigidity and to secure structural supports of 10-18; one of four sealed sides of top element of VIP panel acts as raised platform base (FIG. 5)-20; the stamped "X" shaped raised reliefs for structural rigidity of exterior face of top element—21; the linear horizontal raised ridge laterally flanking each "X" shape of 21-23 and the top inverted "V" shaped structural element above 21 on face of top element—47, all occur rather simultaneously with one downward stroke of the TUM hitting the underlying TUF in a single operation. In other words, one singular stroke of the TUM creates seven complete design features all at once. However, it must be understood that the entire perimeter distal end of each one of four sealed sides of top element of VIP panel acts as raised platform base (FIG. 5)-20 of the top element which has a flange attached to it and subsequently orients itself within another separate operation, at right angles to the latter. That flange is shown as the perimeter top tab or flange which interlocks with bottom tab of 1-22 in FIG. 2 and FIG. 2e and presents as a continuous perimeter tab or flange, which is bent at right angles in the next subsequent operation.

Accessory Structural Elements

It was indicated within the specification that when the air contents of a closed vessel are withdrawn, and a vacuum state is created; such as within this vacuum canister; . . . the crushing atmospheric force of 14 lbs./sq. inch will normally cause this sealed vessel to collapse. What in fact prevents this crushing phenomenon from occurring are the following design elements. The vertical structural support with hole to facilitate evacuation of air and creation of vacuum—10 shown in FIG. 1 is a high impact resistant plastic rectangular shaped bar which is manufactured as a solid plastic extrusion. Subsequently, it undergoes a stamping process which stamps out repetitive apertures within its entire length at discretely spaced intervals; said apertures shown in FIG. 1 as the aperture for evacuation of air in vertical structural support of 10-11. Simultaneously, a specialized combination stamping die also cuts or stamps notches, also at various discretely spaced intervals, which are not graphically shown in any of the drawings in order to simplify the graphic presentation herein. However, it is noteworthy to mention that the entire perpendicular complementary solid plastic extrusion of the horizontal structural cross strut which fits into 13 and 23-15 slips into these aforementioned notches; thus forming a cruciform perpendicular lattice grid.

In a separate operation, this horizontal structural cross-strut which fits into 13 and 23—15 is also stamped out as another separate high impact resistant plastic rectangular shaped bar which is also manufactured as a solid plastic extrusion. Subsequently, it also undergoes a similar stamping process which stamps out repetitive apertures within its entire length at discretely spaced intervals; said apertures shown in FIG. 1a, as the aperture in horizontal cross-strut of 15 which permits entry of vacuum needle—17 to facilitate the evacuation of air. Moreover, this same stamping process also produces the "V" notches at top and bottom of structural cross-strut which receives 4 & 18-16 which accommodate the bottom continuous linear raised reliefs for rigidity and to secure vertical structural support of 10-4 and the continuous linear depressed troughs for rigidity and to secure structural supports of 10-18.

It must also be understood that the vertical structural support with hole to facilitate evacuation of air and creation of vacuum—10 courses the entire length of the continuous depressed linear trough created by the two lateral raised reliefs of 4-5 shown in FIG. 1 within the bottom element and also the continuous linear raised relief created by the two lateral depressed troughs of 18-19 of FIG. 2 of the top element, where in fact it tightly fits into the bottom trough created by the continuous depressed linear trough created by the two lateral raised reliefs of 4-5; as well as fitting into the top trough created by the continuous linear raised relief created by the two lateral depressed troughs of 18-19. The vertical structural support with hole to facilitate evacuation of air and creation of vacuum—10 is also being tightly held into place by both dual raised ridges of the continuous linear raised relief for rigidity and to secure vertical structural support of 10-4 of FIG. 1, which laterally flank each vertical structural support with hole to facilitate evacuation of air and creation of vacuum—10 on either side at the bottom interior face, as well as both dual concavities of the continuous linear depressed troughs for rigidity and to secure structural supports of 10-18 at the top side of interior face of the top element. In essence, the continuous linear raised relief created by the two lateral depressed troughs of 18-19 of the top element is the same complementary trough as the continuous depressed linear trough created by the two lateral raised reliefs of 4-5 in the bottom element which runs its entire length within the top element. Therefore, the vertical structural support with hole to facilitate evacuation of air and creation of vacuum—10 likewise tightly fits into the linear trough of the continuous linear raised relief created by the two lateral depressed troughs of 18-19; thus also being held in perfect vertical alignment by the dual side-by-side shallow depressions of the continuous linear depressed troughs for rigidity and to secure structural supports of 10-18, which flank the vertical structural support with hole to facilitate evacuation of air and creation of vacuum—10 at its top border when the top element is ready to be sealed.

Figure 3:
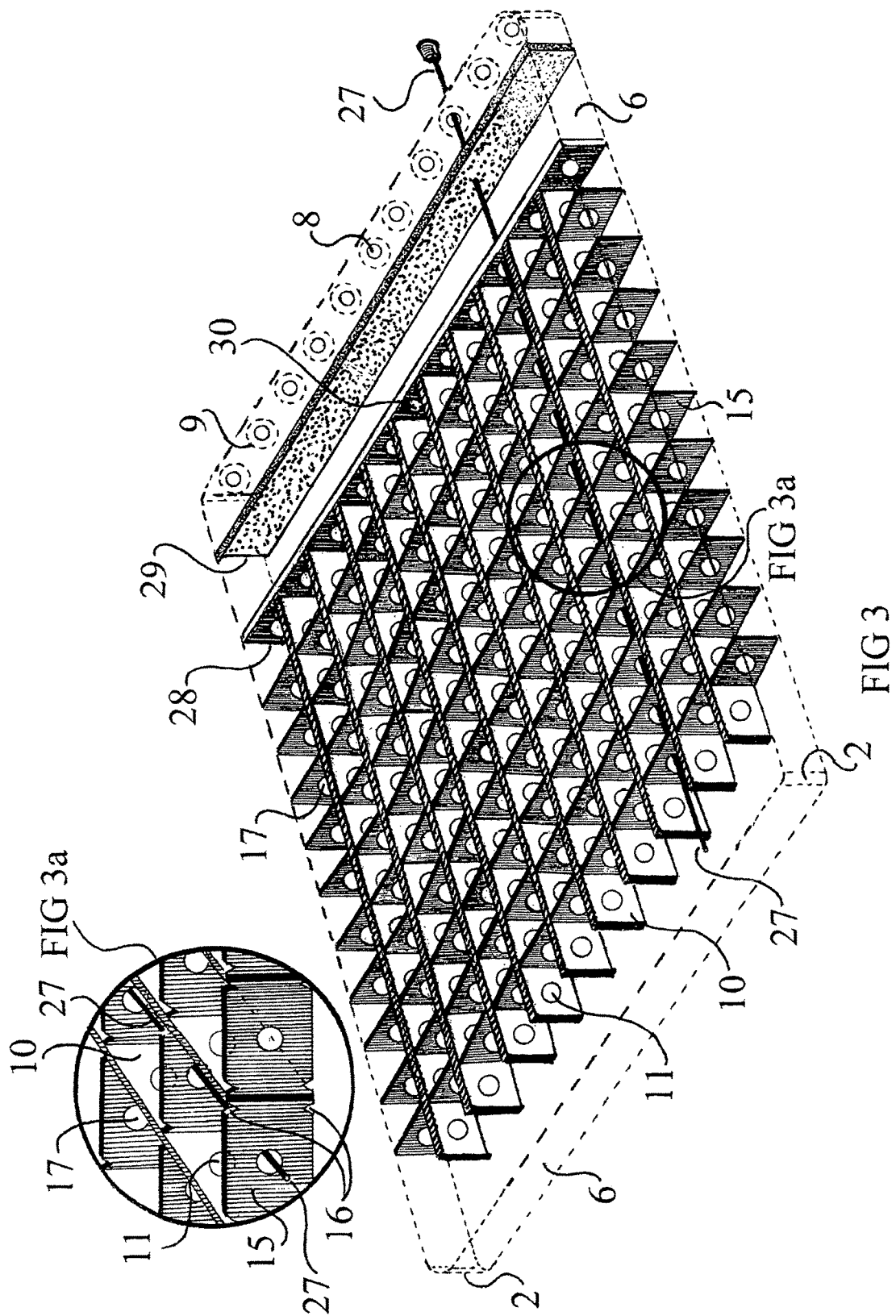

Next, a very much similar high impact resistant plastic rectangular shaped bar, which is manufactured as a plastic extrusion is fabricated as the horizontal structural cross-strut which fits into 13 and 23-15 shown in FIG. 2. Also similar to the vertical structural support with hole to facilitate evacuation of air and creation of vacuum—10 of FIG. 1, this horizontal structural cross-strut which fits into 13 and 23-15 undergoes a stamping process which stamps out repetitive apertures within its entire length at discreet intervals, said apertures are shown in FIG. 1 and FIG. 2 as the aperture in horizontal cross-strut of 15 which permits entry of vacuum needle—17; and also shown in FIG. 3 and FIG. 3*a*. Also alternating with each aperture of the aperture in horizontal cross-strut of 15 which permits entry of vacuum needle—17 are these slotted notches; not shown graphically, which allow the entire rectangular bar of horizontal structural cross-strut which fits into 13 and 23-15 to slide down upon the vertical structural support with hole to facilitate evacuation of air and creation of vacuum—10. When each rectangular bar of horizontal structural cross-strut which fits into 13 and 23-15 slides down over the vertical structural support with hole to facilitate evacuation of air and creation of vacuum—10, the entire array forms a cruciform lattice grid of 144 compartments, with each horizontal structural cross-strut which fits into 13 and 23-15 oriented perpendicular to each the vertical structural support with hole to facilitate evacuation of air and creation of vacuum—10 and with every internal compartment having each its own aperture to facilitate the evacuation of air as shown in FIG. 3.

It is noteworthy to mention that while the vertical structural support with hole to facilitate evacuation of air and creation of vacuum—10 fits tightly into the continuous depressed linear trough created by the two lateral raised reliefs of 4-5 of the bottom element, as well as the continuous linear raised relief created by the two lateral depressed troughs of 18-19 of the top element; . . . each bottom aspect of the horizontal structural cross-strut which fits into 13 and 23-15 also fits into the short lateral troughs of the horizontal depressed trough which receives structural cross-strut 15 with aperture—13 of FIG. 1 which is in front of, and in back of each "X" shaped stamped "X" shaped depression for structural stability of exterior face of bottom element—12 of the bottom element; while at the same time, each top aspect of the horizontal structural cross-strut which fits into 13 and 23-15 also fits into each short lateral trough of each linear horizontal raised ridge laterally flanking each "X" shape of 21-23; which is in front of, and in back of the "X" shaped stamped "X" shaped raised reliefs for structural rigidity of exterior face of top element—21; as shown in FIG. 2*b*, is the interior face of the top element. "V" shaped notches are also stamped at the top and bottom aspects of the horizontal structural cross-strut which fits into 13 and 23-15 as shown via the "V" notches at top and bottom of structural cross-strut which receive 4 & 18-16 within FIG. 3*a* and FIG. 4. Thus, completing this insertion process forming the latter cruciform lattice perpendicular grid, the dual lateral "V" shaped notches of the "V" notches at top and bottom of structural cross-strut which receive 4 & 18-16 at the bottom of each horizontal structural cross strut which fits into 13 and 23-15, align and fit over both dual continuous linear raised relief for rigidity and to secure vertical structural support of 10-4 of the bottom element's interior face; as well as the top "V" notches at top and bottom of structural cross-strut which receive 4 & 18-16 aligning and fitting over both dual continuous linear depressed troughs for rigidity and to secure structural supports of 10-18 as raised ridges of the interior face of the top element.

Yet another structural design feature is also incorporated within the barrel vault "X" shape of the stamped "X" shaped depression for structural stability of exterior face of bottom element—12 and the bottom inverted "V" shaped structural element above 12 on face of bottom element—46 within the lower element and the stamped "X" shaped raised reliefs for structural rigidity of exterior face of top element—21 and the top inverted "V" shaped structural element above 21 on face of top element—47 within the upper element. Said additional design feature is camber, or a slight gradual downward sloping curvature, starting at the very epicenter of the "X" shape, which is designed as a gentle slope or gradient, and which declines ever so slightly toward each of the four corners comprised of the horizontal structural cross-strut which fits into 13 and 23-15 and the vertical structural support with hole to facilitate evacuation of air and creation of vacuum—10 on both the bottom and top elements. This camber automatically imparts a crown-like dome shape to the very epicenter or intersection of the four barrel vault "X" shaped diagonals of the stamped "X" shaped depression for structural stability of exterior face of bottom element—12 and the stamped "X" shaped raised reliefs for structural rigidity of exterior face of top element—21; which is at a slightly higher elevation than each of the four "X" shaped end diagonal terminal points. This dome-like effect adds increased resistance to the crushing atmospheric force of 14 lbs./sq. inch on each of the 144 one inch square individual compartments of both top and bottom elements. For all intents and purposes this domed design feature is somewhat similar and analogous in appearance to a typical four pronged "starfish." The next crucial accessory element within this vacuum apparatus is yet another high impact plastic rectangular bar produced as a solid plastic extrusion shown as the high impact resistant plastic pressure bar with serial apertures for insertion of needles—28 shown within FIG. 3; which is machined at the same exact height as the vertical structural support with hole to facilitate evacuation of air and creation of vacuum—10. Whereupon, in a separate machining operation the high impact resistant plastic pressure bar with serial apertures for insertion of needles—28 is stamped with twelve repetitive apertures which are oriented midway between each vertical structural support with hole to facilitate evacuation of air and creation of vacuum—10 support bar.

The express purpose of these twelve apertures is to allow the twelve vacuum needles to be inserted through aperture in horizontal cross-strut of 15 which permits entry of vacuum needle—27 and to be inserted midway through each vertical columnar space formed by the side-by-side parallel relationship of each eleven vertical structural support with hole to facilitate evacuation of air and creation of vacuum—10 in these high impact rectangular bars.

The final accessory element within this vacuum apparatus is the quintessential compressible rubber gasket which is a rectangular shaped piece cut at the same exact height as the high impact resistant plastic pressure bar with serial apertures for insertion of needles—28 and is graphically shown as the compressible rubber gasket which seals exterior apertures from entry of outside air—29 within FIG. 3. Therefobre, FIG. 3 demonstrates that the eleven vertical structural support with hole to facilitate evacuation of air and creation of vacuum—10 rectangular bars are oriented at right angles to, and thus perpendicular to the high impact resistant plastic pressure bar with serial apertures for insertion of needles—28, whereby this rubber gasket is placed immediately behind the high impact resistant plastic pressure bar with serial apertures for insertion of needles—28 and therefore completely covers the entire frontal space of the vacuum apparatus. In other words, it courses from one end; e.g. the left end of the vacuum vessel to the complete opposite right side, and also fills that front internal space from the very top of the interior face of FIG. 2 (top element) to the very bottom of the interior face of FIG. 1 (bottom element). What is crucial to this arrangement and orientation is that the eleven perpendicular rectangular bars of said vertical structural support with hole to facilitate evacuation of air and creation of vacuum—10 are very so slightly over-machined at such an excessive critical length; such that when finally inserted forcibly within their respective nesting troughs of the continuous depressed linear trough created by the two lateral raised reliefs of 4-5 of the bottom element, and the continuous linear raised relief created by the two lateral depressed troughs of 18-19 of the top element; whereby they in fact exert a forward compressive force against the high impact resistant plastic pressure bar with serial apertures for insertion of needles—28, due to their excessive length; . . . which in turn causes the compressible rubber gasket; which seals exterior apertures from entry of outside air—29 to bulge tightly into the front recesses of the vacuum apparatus, thus forming a tight seal around the eleven front apertures of all the exterior apertures for insertion of vacuum needle for evacuation of air contents—8 which prohibits unwanted outside air from entering the vessel.

Accessory Structural Design Features

After the cruciform lattice grid of 144 compartments, comprised of the vertical structural support with hole to facilitate evacuation of air and creation of vacuum—10 and the horizontal structural cross-strut which fits into 13 and 23-15 are inserted within their respective bottom troughs of the continuous depressed linear trough created by the two lateral raised reliefs of 4-5 and top troughs of the continuous linear raised relief created by the two lateral depressed troughs of 18-19; along with each perpendicular horizontal structural cross-strut which fits into 13 and 23-15 being fitted into each respective bottom horizontal depressed trough which receives structural cross-strut 15 with aperture—13 as a lateral trough and each top linear horizontal raised ridge laterally flanking each "X" shape of 21-23 as an underside lateral trough; . . . and additionally with the perpendicular rectangular bar of the high impact resistant plastic pressure bar with serial apertures for insertion of needles—28 against the compressible rubber gasket which seals exterior apertures from entry of outside air—29; . . . then the assembly is complete and ready for hermetic sealing. Thus, it must be understood that when the continuous linear raised relief created by the two lateral depressed troughs of 18-19 of the top element is nestled on top of the vertical structural support with hole to facilitate evacuation of air and creation of vacuum—10; and the linear horizontal raised ridge laterally flanking each "X" shape of —23 is nestled on top of the horizontal structural cross-strut which fits into 13 and 23-15 of the top element; along with the high impact resistant plastic pressure bar with serial apertures for insertion of needles—28 and the compressible rubber gasket which seals exterior apertures from entry of outside air—29 in their respective positions as shown in FIG. 3, then sealing is ready. This alignment of top element in juxtaposition above the bottom element, whereby the vertical structural support with hole to facilitate evacuation of air and creation of vacuum—10 is anchored within the continuous depressed linear trough created by the two lateral raised reliefs of 4-5 and the continuous linear raised relief created by the two lateral depressed troughs of 18-19; . . . and additionally, the horizontal structural cross-strut which fits into 13 and 23-15 is anchored within the horizontal depressed trough which receives structural cross-strut 15 with aperture—13 and the linear horizontal raised ridge laterally flanking each "X" shape of 21-23 thus brings about the exact alignment of both the bottom flange of the perimeter bottom tab or flange which interlocks with top tab or flange of 22-1 with the top flange of the perimeter top tab or flange which interlocks with bottom tab of 1-22.

Figure 6:
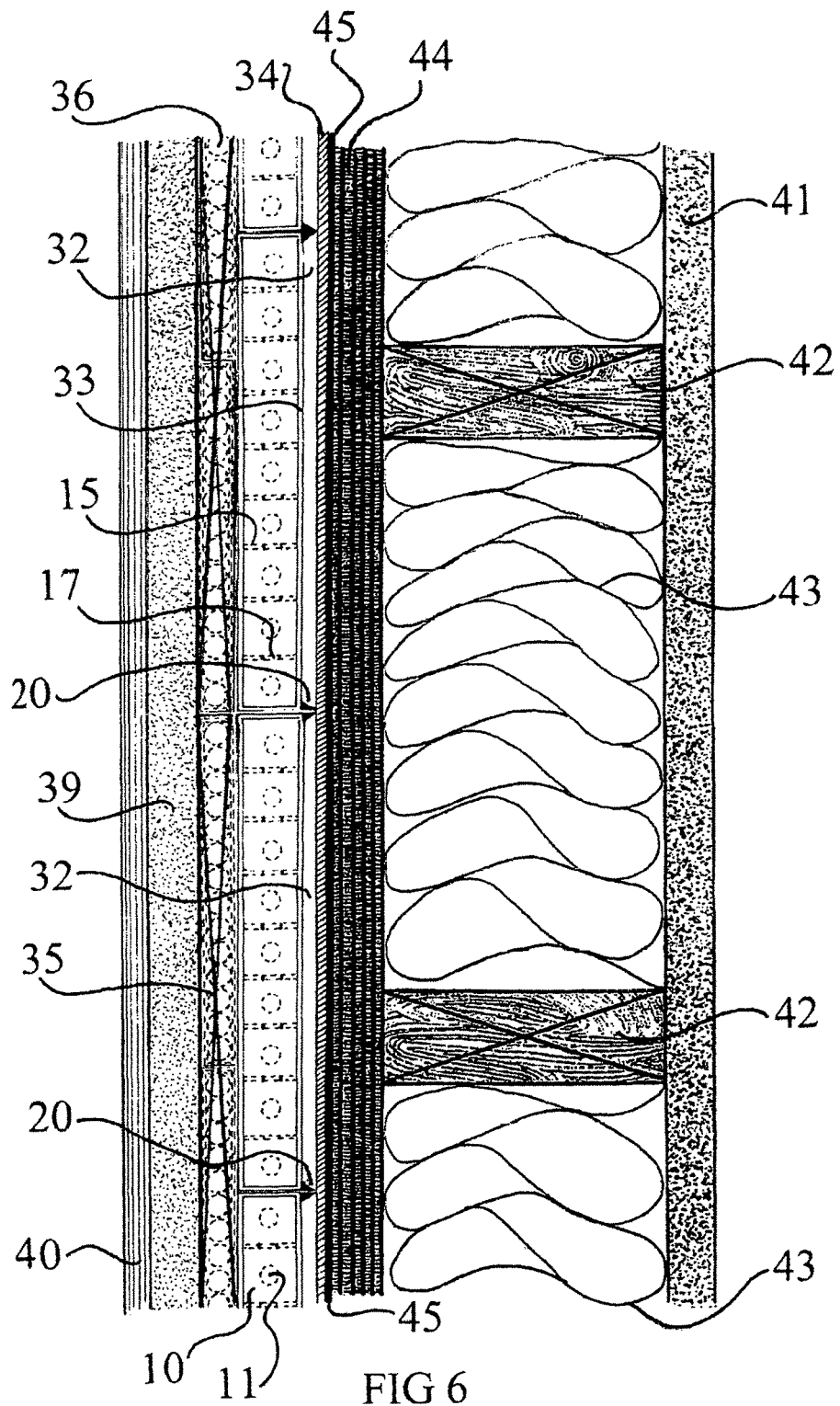

This exact alignment occurs because the bottom element of FIG. 1 and the top element of FIG. 2 have the precise exact same internal dimensions; except every one of four sides of bottom element of aluminum VIP panel—6; which being the four sides of the bottom element, are taller than the top element's four very short shallow sides i.e. as one of four sealed sides of top element of VIP panel acts as raised platform base (FIG. 5)-20. Accordingly, whereas the bottom element is essentially a shallow tray, the top element is for the most part, merely a very thin shallow lid top. In other words, both bottom element and top element have exactly the same equally dimensioned four sides, both presenting as identically sized squares, each with four corner radii instead of four right angle corners. This arrangement is best illustrated by FIG. 2e, whereby the top tab or flange of the top element, the perimeter top tab or flange which interlocks with bottom tab of 1-22 lies on top of the bottom tab or flange of the perimeter bottom tab or flange which interlocks with top tab or flange of 22-1. Next, as both elements are in close unison, they are subjected to a mechanical bonding press, whereby the four radii allow this tremendous force within this machine to fully circumscribe the entire perimeter of both flanges, thus curling one layer under the other; end over end, to effectuate therein, an impenetrable hermetically sealed vessel. The best illustration of this sealing maneuver is to be found in the real world examples of the sealing of a typical ubiquitous tuna fish can; sardine or anchovy can. That very sturdy durable lip which forms from this sealing maneuver is shown in its formative beginning stage as one of four sealed sides of top element of VIP panel acts as raised platform base (FIG. 5)—20 within FIG. 2e and also FIG. 2c and finally, its completed state within FIG. 5 and FIG. 6, also shown as one of four sealed sides of top element of VIP panel acts as raised platform base (FIG. 5)-20.

Immediately after this hermetical sealing process occurs, the vessel is finally ready to have its air contents evacuated via the insertion of twelve vacuum needles via inserted needle through 17 apertures for vacuum pump to evacuate air in VIP—27 by way of the twelve front apertures of each exterior aperture for insertion of vacuum needle for evacuation of air contents—8. The inserted needles are long enough to penetrate first through the compressible rubber gasket which seals exterior apertures from entry of outside air—29, next on through into the twelve serial apertures stamped into high impact pressure bar for entry of vacuum needle—30; . . . then the rectangular high impact resistant plastic pressure bar with serial apertures for insertion of needles—28; . . . whereby each needle thus traverses at the center of, and midway between each vertical structural support with hole to facilitate evacuation of air and creation of vacuum—10; thereafter, past the first rank compartment forward through each of the twelve serial rank and file apertures within horizontal structural cross-strut which fits into 13 and 23-15 to the complete opposite side of the twelfth rank compartment at the complete opposite end from its original penetration entrance. It is noteworthy to mention that this closed vessel is also heated, thus causing the air molecules to become agitated; such that when a vacuum pump is attached to each needle, the agitated air contents therein are rapidly moving and easily removed. Hence, most of these 144 cube shaped compartments have four apertures; one front, one back and two on each side.

It was previously mentioned within this specification's teaching that whenever a vacuum is created within a hermetically sealed closed vessel, the walls comprising that vessel's envelope are highly susceptible to the crushing atmospheric forces of 14 lbs./sq. inch; which will inevitably tend to crush the vessel's six walls; comprised of each one of four sides of bottom element of aluminum VIP panel—6 and the two exterior faces of FIG. 1 (exterior face not shown) and FIG. 2 (exterior face shown). However, it can be determined from the teaching within this specification herein that since this vessel has twelve vertical compartments and twelve horizontal compartments; all of which together form a four-sided cruciform pattern; then understandably, this cruciform arrangement yields 144 one inch square totally supported, cube-shaped compartments; See FIG. 3. Therefore, this VIP panel does in fact measure twelve inches square for all four equal sides. By and large then, each of the eleven vertical structural support with holes to facilitate evacuation of air and creation of vacuum—10, hence, vertically aligned; . . . and each of the eleven horizontally aligned, together and in unison, both prevent the two exterior broad faces of the top and bottom elements from being crushed by this atmospheric pressure.

This impact resistance is further supported by the vertical troughs of the continuous depressed linear trough created by the two lateral raised reliefs of 4-5, which further support the vertical structural support with hole to facilitate evacuation of air and creation of vacuum—10 at the bottom element, along with the continuous linear raised relief created by the two lateral depressed troughs of 18-19 at the top element. Additionally, the horizontal lateral troughs of the horizontal depressed trough which receives structural cross-strut 15 with aperture—13 at the bottom element, and the linear horizontal raised ridge laterally flanking each "X" shape of 21-23 which being the lateral trough at the top element, also lend their support to the horizontally aligned horizontal structural cross-strut which fits into 13 and 23-15. Therefore, in essence, only the 144 one inch square, cube shaped individualized compartments are wholly unsupported and thus vulnerable to this atmospheric crushing force of 14 lbs./square inch. Since this VIP vessel has only six sides; the four shallow sides, which are one of the four sides of bottom element of aluminum VIP panel—6 are one inch high and buttressed by the eleven horizontal structural cross-struts which receive 13 and 23-15 on each distal end of the opposing two horizontal sides (i.e. left and right); while the eleven vertical structural support with hole to facilitate evacuation of air and creation of vacuum—10 buttress the other two opposing vertical sides (i.e. front to back) in the other direction.

It must also be recalled from this specification that specific one inch high three shallow sides each contain the stamped alternating pattern of the stamped side interior oval raised relief pattern for structural stability of bottom element of VIP panel—3 incorporated therein, which also aids in resisting the crushing atmospheric force. Moreover, the combined perimeter intertwined bottom flange of the perimeter bottom tab or flange which interlocks with top tab or flange of 22-1 along with the top flange of the perimeter top tab or flange which interlocks with bottom tab of 1-22; when mechanically bonded together, form a stiff, resistant, beam-like rigid upper lip; (view top of any typical tuna fish can) depicted herein graphically as one of four sealed sides of top element of VIP panel acts as raised platform base (FIG. 5)-20, which helps buttress the complete upper perimeter border of the VIP evacuated vessel. Analogously, the perimeter lower border of the bottom element, identified as the bottom continuous perimeter structural inclination which creates a raised foot-like pod—7, also forms a beam-like stiff resistance to these crushing atmospheric forces. Therefore, attention must now only focus upon each solitary 144 unsupported and vulnerable one-inch square cubes.

In engineering parlance, a uniformly distributed load or force, such as the 14 lbs./square inch atmospheric pressure normally tends to affect any unsupported structure, such as the 144 vulnerable one-inch squares directly at each of their respective central core; thus tending to cause the "X' shaped pattern of the stamped "X" shaped depression for structural stability of exterior face of bottom element—12 and the stamped "X" shaped raised reliefs for structural rigidity of exterior face of top element—21 to deflect inward and crush at the very center of each 144 one inch square surface. However, this customary crushing event does not in fact occur within this invention simply because of the inherent special design features of the aforementioned "X" shaped appurtenances stamped into each one-inch square compartment. In classical roman architecture, the barrel vault was designed utilizing the main structural support feature of the roman arch. Accordingly, each classically designed roman arch incorporated at the apex of the arch, the wedge-shaped trapezoidal "keystone" at its center, which imparted lateral thrust to each descending leg of the roman arch. Accordingly, because of its weight and its trapezoidal shape; this "keystone" or wedge bore down upon the arch-like semi-circular sides; whereby as it slid lower and lower, the wedge imparted increasing lateral pressure or thrust on each opposing semi-circular side of the wedge (simply because it could not slip through), thereafter on downward through the semi-circular walls of the arch to the buttressed base at the bottom of the arch. In theory then, this lateral thrust prevented the arch from collapsing; therefore, the arch was able to carry or support tremendous loads above its arch-like structure at the center of the "keystone." Witness the arched walls and the "keystone" of the famous Colosseum in Rome, Italy.

By and large, the teaching within this specification graphically demonstrates by the stamped "X" shaped depression for structural stability of exterior face of bottom element—12 in FIG. 4a; which "X" shaped design is shown as the interior face of the bottom element, and accordingly, also shown as an upside-down barrel vault; whereas instead, the stamped "X" shaped raised reliefs for structural rigidity of exterior face of top element—21 of FIGS. 4b and 4c graphically shown as a right-side up "X" shaped barrel vault. Analogously, this wedge-shaped "keystone" described above is graphically shown as the bottom inverted "V" shaped structural element above 12 on face of bottom element—46 in FIG. 4a and FIG. 4c while the top inverted "V" shaped structural element above 21 on face of top element—47 is shown within FIG. 4b and FIG. 4c Therefore, it is to be expressly understood that both each bottom inverted "V" shaped structural element above 12 on face of bottom element—46 sitting atop of which is each stamped "X" shaped depression for structural stability of exterior face of bottom element—12, as well as each top inverted "V" shaped structural element above 21 on face of top element—47 sitting atop of which is each stamped "X" shaped raised reliefs for structural rigidity of exterior face of top element—21; wherein all are inverted "V" shaped raised projections above the planar exterior surfaces of both the bottom and top elements. The stamped "X" shaped depression for structural stability of exterior face of bottom element—12 and the stamped "X" shaped raised reliefs for structural rigidity of exterior of top element—21 are the raised arch-like barrel-vault structures; while the bottom inverted "V" shaped structural element above 12 on face of bottom element—46 and the top inverted "V" shaped structural element above 21 on face of top element—47 as inverted "V" shaped design elements, both rise above the apex of each latter arch-like barrel vault, and therefore behave much like the classical roman "keystone" wedge. See FIG. 4c for further graphic clarification of the inverted "V" shaped design elements positioned at the very apex of each stamped "X" shaped depression for structural stability of exterior face of bottom element—12 and the apex of each stamped "X" shaped raised reliefs for structural rigidity of exterior face of top element—21. Thus, the crushing atmospheric force at each one-inch unsupported square in pure engineering mechanics normally presents as a uniform load of 14 lbs/square inch spanning across each double diagonal aspect of the "X" shape raised reliefs of both the stamped "X" shaped depression for structural stability of exterior face of bottom element—12 and the stamped "X" shaped raised reliefs for structural rigidity of exterior face of top element—21. However, the stamped raised relief of each criss-crossed, diagonal design of the "X" shaped bottom inverted "V" shaped structural element above 12 on face of bottom element—46 and each top inverted "V" shaped structural element above 21 on face of top element—47, each inherently perform as the classical "keystone" wedge, with their structural feature produced as an inverted upside-down "V" with its apical end at the apex of 46 and 47-14 of each bottom inverted "V" shaped structural element above 12 on face of bottom element—46, and each top inverted "V" shaped structural element above 21 on face of top element—47 each pointing upward. Subsequently, the atmospheric force attempts to depress this "V" shaped structural design feature at its very apex of 46 and 47-14; which is at the very apical end of each apex of the bottom inverted "V" shaped structural element above 12 on face of bottom element—46, and each top inverted "V" shaped structural element above 21 on face of top element—47 and therefore said force naturally attempts to spread each "V" leg apart and downward. This downward pressure propagated along each bottom and top "V" shaped structure, then spreads apart the "V" shaped sides of both the bottom inverted "V" shaped structural element above 12 on face of bottom element—46 and the top inverted "V" shaped structural element above 21 on face of top element—47; which in turn, impart lateral thrust to the barrel-vault walls of each stamped "X" shaped depression for structural stability of exterior face of bottom element—12 and each stamped "X" shaped raised reliefs for structural rigidity of exterior face of top element—21, similar to the ancient classical architectural "keystone". This lateral thrust is thus propagated along the entire continuum of each double diagonal barrel-vault "X", whereby this crushing force is now transferred immediately to each braced corner of the square cube, consisting of one impact resistant vertical structural support with hole to facilitate evacuation of air and creation of vacuum—10 and one impact resistant horizontal structural cross-strut which fits into 13 and 23-15. Therefore, for the one-inch square cube to remain in static equilibrium with zero deflection; i.e. without being crushed inward, the of upward impact resistant reaction forces at each opposing corner diagonal must equal 7 lbs each; while the crushing uniform force at each diagonal span equals 14 lbs,/square inch. In other words, the downward crushing atmospheric forces of 14 lbs. are cancelled out to zero by both upward forces of 7 lbs. times two diagonal reaction corners of each vertical structural support with hole to facilitate evacuation of air and creation of vacuum—10 and horizontal structural cross-strut which fits into 13 and 23-15; . . . thus achieving zero static equilibrium with no crushing of the vacuum vessel of the VIP vacuum panel which is the subject of this invention—33 whatsoever.

Thermodynamic Design Features

Accompanying these foregoing inherent structural design features which combine to resist and cancel out the potential crushing atmospheric forces of 14 lbs./square inch, are other accessory design features which aid and abet the non-transfer of thermo-molecular heat energy from needlessly escaping through the exterior walls of a heated building's interior environment during the winter months; or conversely, the unwanted gain of unrelenting heat into the building during the hot summer months. It thus becomes a scientific fact that if the entire VIP vacuum panel which is the subject of this invention—33 is not crushed when its internal air contents are evacuated, then this complete vacuum state within said VIP vacuum panel which is the subject of this invention—33 will absolutely prevent this undesirable thermo-molecular heat transfer from occurring in either direction within a building's interior. This fact is well known because heat, from within a building; which is for the most part, agitated thermo-molecular energy as particles of fast moving air molecules; . . . thus consisting mainly of 78% nitrogen and 21% oxygen, will in fact endeavor to seek equilibrium with its immediate neighboring proximate air molecules comprised of mainly slow moving outside air molecules within a cold winter environment of perhaps 20° F. ambient surrounding air.

It is also a fact that the outside cold air temperature of perhaps 20° F. has slower moving air molecules with less collisions between each molecule as compared with the 70° F. warm interior air, with faster moving molecules and with more collisions per molecule. What in fact then happens is that the building's expensively heated interior air molecules will migrate through its neighboring exterior wall assembly of FIG. 5's graphically illustrated building wall components and ceiling components; mainly via conduction and convection air currents; thus seeking to achieve balanced equilibrium with the extremely harsh 20° F. cold outside air. In performance of this scientific fact, the higher interior 70° F.

temperature molecules will collide less frequently because of the proximity of the outside cold 20° F. slower moving molecules and therefore, as a result, this interior 70° F. temperature will soon begin to lose the kinetic energy of its own expensively created higher temperature. It is noteworthy to mention that this warmer 70° F. expensively heated air will never achieve equilibrium with the neighboring harsh unrelenting and persistent cold 20° F. outside air; simply because the warm 70° F. house structure is small and miniscule in comparison to the vast expanse of 20° F. ubiquitous never ending cold outside air.

Instead, what happens at the interface of this VIP vacuum panel which is the subject of this invention—33, is that those newly tempered lowered heated warm air molecules from the building's 70° F. interior are eventually stopped by the vacuum created therein, simply because there is a complete total absence of any moving air molecules inside this VIP vacuum panel which is the subject of this invention—33. In short, this transfer of heat from the warmed 70° F. interior environment of a building mainly occurs only via convection air currents and conduction through its neighboring building construction materials. Also, any solid material encountered in its outward travel transfers heat best, while a somewhat porous or gaseous encounter transfers heat rather poorly. Therefore, it is a fact that heat rises in a building's interior because the colder bottom-most, interior air is much more dense; and thus drops to the floor; whereby this cold air subsequently becomes heated by the hot baseboard radiators. Hence, this previously cold air instead now rises because it has now become agitated heated air with faster moving air molecules. This process of alternating hot and cold interior circulating air currents within a building's interior is in essence, air convection pure and simple. In other words, hot air rises, while cold air, being much more dense, will fall to the floor; thus creating re-circulating and agitated moving convection air currents.

Hence, this upward migration of 70° F. heated air wafts against the building's interior aspect of the colder exterior wall and ceiling due to the outside ambient winter temperature being 20° F.; and naturally seeks to achieve equilibrium with the environment's cold 20° F. outside air. In thermodynamic theory, the interior 70° F. heated air molecules are moving faster and colliding more frequently with each other, while the cold outside air molecules are barely moving at all, and barely colliding at all with each other. Therefore, in its quest to achieve equilibrium, simply because nature demands equilibrium; the heated 70° F. interior air molecules will always migrate from the interior warm side within the building, to the outside exterior cold side. Accordingly, this transmigration of kinetic energy, and equilibrium seeking, subsequently occurs mainly via conduction through the wall assembly's construction materials. Simply because convection currents are no longer the dominant kinetic force; once past the building's interior sheetrock gypsum wall board—41. Thus, this first encounter of conduction within the wall assembly is shown in FIG. 5 with the building's interior sheetrock gypsum wall board—41. Although somewhat porous, heat travels through this material first. The next array of construction materials lies within the same spatial plane, whereby 90% of the heated air, next encounters the building's fiberglass batt-insulation trapping air with R-13 value—43; consisting of gaseous trapped air molecules within that fiberglass batt-insulation material. The remaining 10% of the heated air travels somewhat faster through the denser building's load-bearing 2×4 wooden stud—42; simply because the fiberglass material's insulated gaseous air has fewer molecules farther apart than the denser 2×4 wood stud, where those previously heated 70° F. air molecules eventually slow down, collide less frequently, and thus undergo a somewhat lower temperature change. This 90% lower heated air next encounters the building's exterior CDX grade plywood sheathing—44, and finally the building's 15 lb. asphalt impregnated waterproof tar paper—45, which is the very thin black asphalt impregnated felt paper. It must be understood that this transmigration process outward bound will normally occur with or without the VIP vacuum panel which is the subject of this invention—33 in place, simply because this latter vacuum panel is installed retrograde to all of these aforementioned construction materials.

It is the next sequence of events which teaches what occurs in a typical exterior applied retrofit of said VIP vacuum panel which is the subject of this invention—33. Hence, in a typical retrofit exterior applied installation process, which this invention teaches, the VIP plastic extruded carrier channel for securing the VIP panel in its proper orientation—34 attached exterior to the building's 15 lb. asphalt impregnated waterproof tar paper—45 or, building felt. This plastic extruded carrier channel for securing the VIP panel in its proper orientation—34 as an installation bar does not allow the VIP vacuum panel which is the subject of this invention—33 to sit flush against the aforementioned construction materials of the building's exterior wall assembly for transmigration conduction to occur. Additionally, the combined intertwined flanges of the perimeter bottom tab or flange which interlocks with top tab or flange of 22-1 and the perimeter top tab or flange which interlocks with bottom of tab 1-22, together, when sealed under tremendous pressure, create in consort the raised protruded lip of one of four sealed sides of top element of VIP puncl acts as raised platform base (FIG. 5)—20 which further distances the exterior face of the VIP vacuum panel which is the subject of this invention—33 away from direct intimate contact with the building's expensively heated exterior wall envelope. Hence, once again conduction is impaired because this newly created thin gaseous insulating film of air, as a thin film of trapped air acting as an abetting insulation medium—32 directly impedes molecular conduction per se.

Therefore, the plastic extruded carrier channel for securing the VIP panel in its proper orientation—34 and one of four sealed sides of top element of VIP panel acts as raised platform base (FIG. 5)—20, by virtue of their inherent physical and spatial design features automatically trap this insulating thin film of gaseous air shown as the thin film of trapped air acting as an abetting insulation medium—32 in FIG. 5. Hence, for purposes of this teaching, let us assume that the interior heated air environment within the building during the winter months is 70° F. and the cold outside winter air temperature is 20° F. It thus becomes a reasonable scientific assumption that this thin film of insulating gaseous air shown as the thin film of trapped air acting as an abetting insulation medium—32, with henceforth slow moving air molecules with less collisions because of the aforementioned outward transmigration, now instead becomes perhaps 45° F. by being in immediate intimate contact with the face of the VIP vacuum panel which is the subject of this invention—33. It must be recalled that in its travel through the wall assembly, the initial fast moving interior 70° F. air molecules encountered two major sources of gaseous trapped insulating air; . . . the porous material of the building's fiberglass batt-insulation trapping air with R-13 value—43; and the thin layer of insulating air of the thin film of trapped air acting as an abetting insulation medium—32 thus begins to slow down the fast moving 70° F. interior heated air which subsequently soon begins to encounter fewer and fewer molecules to collide with, each molecule of air being farther apart in its migratory travel to collide with any neighboring molecules, and in this process loses its initial interior starting temperature of 70° F. Thus, this differential loss; attributable to the science of thermodynamic molecular movement is now perhaps approximately a 25° F. difference; i.e. 70° inside the building and 45° F. at the thin film of trapped air acting as an abetting insulation medium—32.

The analogy now being offered to fully understand and grasp this 25° F. temperature change from the initial 70° F. interior heated air to the final 45° F. insulated air of the thin film of trapped air acting as an abetting insulation medium—32 is the following. In the game of billiards involving different colored balls, plus a green cloth covered pool table, along with a long wooden cue stick; . . . the fifteen colored game balls are racked together within a triangular device. Subsequently, the cue stick strikes the white cue ball, which smashes (collides) into the fifteen colored balls. This resulting impact causes various balls to then strike other nearby neighboring balls; which all scatter in different directions. Eventually, within a few seconds, fewer collisions occur, as each of the fifteen balls lose their initial velocity or kinetic energy, and therefore, ricochet off each other less frequently. However, to carry this analogy further, let's assume the white cue ball is alone on an endless pool table with no other ball to collide with. From its initial impact, it will eventually begin to lose its initial velocity and ultimately and eventually stop moving. This white cue ball is analogous to a single molecule of air; except that in a pure vacuum there is not one single air molecule to collide with. Therefore, without any air molecules to collide with from a vacuum state, within the VIP vacuum panel which is the subject of this invention—33, the 45° F. insulated air molecules within the thin film of trapped air acting as an abetting insulation medium—32 can only collide with each other, repetitively, over and over again. Additionally, due to this vacuum state, they also cease their outward transmigration toward the cold winter exterior 20° F. environment. In essence, they temporarily maintain their same 45° F. temperature by only colliding with other neighboring 45° F. air molecules. However, the next generation of molecules of 70° F. interior air, then subsequently undergoes its own drastic loss of temperature difference of 25° F. Thus, eventually continue the same outward journey to transmigrate or venture into the various materials of the same neighboring construction wall assembly, shown therein within FIG. 5; thereby seeking to achieve equilibrium with this gaseous blockade of only 45° F. within this thin film of trapped air acting as an abetting insulation medium—32.

A thorough scientific explanation of what happens during this molecular transmigration movement from the 70° F. interior heated environment outward toward the 45° F. trapped insulated gaseous air space of the thin film of trapped air acting as an abetting insulation medium—32 within FIG. 5 is the following. Since the VIP vacuum panel which is the subject of this invention—33 is completely devoid of any air molecules to collide with, then those 45° F. trapped insulated gaseous air molecules instead keep colliding with each other and therefore this thin film of trapped air acting as an abetting insulation medium—32 of newly formed insulated gaseous air does not lose its recently acquired temperature of 45° F. In pure thermodynamic theory, the air molecules on the interior aspect of the heated building at the building's interior sheetrock gypsum wall board—41 are all 70° F., thus produced via a thermostat setting by the heating equipment of the building's hydronic baseboard aluminum fin radiation. However, on the exterior aspect of this building's interior sheetrock gypsum wall board—41, the temperature at the interface of said building's interior sheetrock gypsum wall board—41 with the interior aspect of the building's fiberglass batt-insulation trapping air with R-13 value—43 may evidence a temperature drop of 5° F. to a reading of 65° F., due to the ½" inch thick somewhat porous nature of that construction material of building's interior sheetrock gypsum wall board—41. Therefore, those air molecules now slow down as they pass through this non-solid porous material and hence collide less frequently as compared with the interior side. In essence, this decreased velocity and fewer collisions now produces a net loss in temperature to 65° F. at the exterior outermost side of the building's interior sheetrock gypsum wall board—41.

Immediately thereafter, these lowered 65° F. air molecules at the outmost layer of the building's interior sheetrock gypsum wall board—41 subsequently travel via conduction through the 3½ inch thick trapped air within the mostly gaseous building's fiberglass batt insulation trapping air with R-13 value—43. It must be recalled that previously it was established that air molecules traverse through a gaseous medium of trapped air rather poorly, i.e. slower and with less collisions than through any solid matter. Therefore, conduction of air molecules through this least dense (not solid) trapped air medium causes a drastic slowdown of the travelling air molecules; which encounters fewer air molecules therein and thus fewer molecules to collide with. Hence, this 3½" inch insulating material of trapped air causes this 65° F. gaseous air at the building's interior sheetrock gypsum wall board—41 therein, in its travel outward, to lose its inherent temperature by another 15° F. to now perhaps 50° F. In other words, it begins its temperature with 65° F. upon entering the insulation and ultimately ends with 50° F. temperature upon its slow departure and its subsequent encounter with the next building material, which is the building's exterior plywood sheathing CDX grade—44. Next, these same air molecules subsequently travel through a somewhat fibrous, yet dense construction material consisting of several layers or plates of fibrous wood veneers glued together. This ½" inch thick travel through this wooden material of the building's exterior plywood sheathing CDX grade—44; which is the building's plywood sheathing diaphragm shown in FIG. 5; although denser than the extremely air entrapped porous material of the building's fiberglass batt-insulation trapping air with R-13 value—43, consequently results in a temperature loss of perhaps an additional 5° F. lowering to 45° F. Once again, this temperature loss occurs at the interface of the outermost side of the building's exterior plywood sheathing CDX grade—44 with the interior side of the building's 15 lb. asphalt impregnated waterproof tar paper—45, the impregnated building felt, which also harbors a very thin film of trapped air beneath its own surface.

Accordingly, aiding this temperature loss is this very thin film of trapped air resulting from the application of the building's 15 lb. asphalt impregnated waterproof tar paper—45 or black felt which is merely stapled onto the building's exterior plywood sheathing CDX grade—44; and thus creates very shallow air pockets or voids of trapped air surrounding each staple. Previously, it was established that the 45° F. insulated air space of thin film of trapped air acting as an abetting insulation medium—32 remains at this constant temperature simply because the transmigration of these gaseous air molecules cannot breach the VIP vacuum panel which is the subject of this invention—33. Notwithstanding this fact, as more newly formed 45° F. air molecules come into contact via conduction from the thin 45° F. air space under the interface of the building's 15 lb. asphalt impregnated waterproof tar paper—45 with the building's exterior plywood sheathing CDX grade—44; whereby these newly coming gaseous air molecules now comingle and collide with the previously formed 45° F. insulated gaseous air space of the thin film of trapped air acting as an abetting insulation medium—32. Now the concentration of 45° F. gaseous air molecules becomes increasingly greater and greater, resulting in more collisions with each other, thus resulting in a temperature rise of one degree to 46° F.

It is noteworthy to mention that because the building's heating equipment has a thermostat set at 70° F., the interior temperature of the building never changes and therefore will always produce an equilibrium seeking 70° F. temperature which will always transmigrate or venture outward. However, because the insulated air from the thin film of trapped air acting as an abetting insulation medium—32 is now 46° F.; the previously mentioned temperatures at each material's interface also concomitantly thereafter rise by one degree each; whereby the original 65° F. at the external side of the building's interior sheetrock gypsum wall board—41 now becomes instead 66° F.; while the 50° F. temperature at the outmost exit area of the building's fiberglass batt-insulation trapping air with R-13 value—43 now becomes 51° F. Accordingly, the 51° F. higher temperature now drives the previous 46° F. insulated air space of the thin film of trapped air acting as an abetting insulation medium—32 with its gaseous air molecules into higher concentrations of more 46° F. gaseous air molecules with greater collisions between them. These subsequent one degree serial temperature increases repeat over and over again as the exterior transmigration of warmer air molecules from the 70° F. interior of the building progresses outward seeking equilibrium with its neighboring air molecules through the process of conduction.

Eventually, through this repetitive transmigration process, the original 45° F. of insulated air space at the thin film of trapped air acting as an abetting insulation medium—32 increases to 46° F.; then 47° F.; then 48° F.; with ensuing constant one degree incremental rises in temperature until equilibrium is finally achieved at 70° F. at the thin film of trapped air acting as an abetting insulation medium—32. In other words, the entire panoply of construction materials will now have a temperature of 70° F. Therefore, from the original interior environment of 70° F.; the building's interior sheetrock gypsum wall board—41; the building's fiberglass batt insulation trapping air with R-13 value—43; the building's exterior plywood sheathing CDX grade—44; the building's 15 lb. asphalt impregnated waterproof tar paper—45 and the thin film of trapped air acting as an abetting insulation medium—32 will all be at 70° F. At this point in time, the buildings thermostat will eventually be satisfied; and the heating equipment will not fire anymore, simply because the interior building environment suffers no loss in temperature through the transmigration of air molecules outward, due to 70° F. equilibrium now being achieved. In essence, the expensive fossil fuel requirement of home heating oil or natural gas can be replaced with electric baseboard radiation which would activate rather infrequently, thus mitigating global warming simply because the 70° F. insulated air space at the thin film of trapped air acting as an abetting insulation medium—32 cannot transmigrate across the vacuum at the VIP vacuum panel which is the subject of this invention—33, and which is the quintessence of this invention.

The invention claimed is:

1. A vacuum insulation panel for use in a building to prevent heat transfer between the building and a surrounding outside environment, said vacuum insulation panel comprising:
   a top and a bottom deep drawn metallic element, wherein the top and bottom deep drawn metallic elements are manufactured as open ended hollow vessels formed from separate blank flat sheets of malleable metallic material and having a geometric shape;
   wherein the top and bottom deep drawn metallic elements comprise a plurality of corner radii which facilitate manufacturing;
   wherein only the bottom deep drawn metallic element of the top and bottom deep drawn metallic elements has an opposing aperture end comprising a plurality of apertures, the plurality of apertures at only the opposing aperture end, and wherein the plurality of apertures are concentrically centered in a plurality of circular depressions, wherein the plurality of circular depressions are for receiving a plurality of metallic sealing discs;
   wherein the bottom deep drawn metallic element has an overall repetitive pattern of raised reliefs stamped on sidewall surfaces of the bottom deep drawn metallic element;
   wherein both the top and bottom deep drawn metallic elements each comprise stamped horizontal and vertical linear troughs incorporated on a respective exterior face, and wherein each respective exterior face further comprises a plurality of stamped "X"-shaped diagonal dome-shaped structural design vaults underlying complementary superimposed inverted "V"-shaped structural design appurtenances;
   wherein an entire perimeter end of each of the top and bottom deep drawn metallic elements culminates in excess bleed metallic material terminating as a continuous perimeter circumscribed by flat flange tabs for hermetic sealing of the top and bottom deep drawn metallic elements into one single unified assembly;
   an inserted grid assembly comprising plastic, the inserted grid assembly arranged in a horizontal and vertical cruciform pattern to form a plurality of internal cubes, each of the plurality of internal cubes having four sides, with each of the four sides being perforated with an aperture;
   wherein the inserted grid assembly comprises a plurality of securing notches and distal surface edges;
   wherein the inserted grid assembly align at only one end with a single plastic rectangular brace strut;
   wherein the single plastic rectangular brace strut comprises a plurality of apertures;
   a compressible rubber material sandwiched between the single plastic rectangular brace strut and the opposing aperture end of the bottom deep drawn metallic element;
   wherein the top deep drawn metallic element, the bottom deep drawn metallic element, the inserted grid assembly, the single plastic rectangular brace strut, the compressible rubber material and the plurality of metallic sealing discs are assembled such that:

each of said distal surface edges of the inserted grid assembly is inserted into the stamped horizontal and vertical linear troughs of both the top and bottom deep drawn metallic elements;
a lateral pressure is exerted against the single plastic rectangular brace strut;
the compressible rubber material is squeezed;
and the plurality of apertures of said opposing aperture end of said bottom deep drawn metallic element are aligned with the said plurality of apertures of said single plastic rectangular brace strut to create a plurality of aligned apertures;
the top deep drawn metallic element and the bottom deep drawn metallic element are mated to embrace and cap said distal surface edges of the inserted grid assembly, wherein at least a portion of sidewall surfaces of the top deep drawn metallic element is flush with an interior side of said sidewall surfaces of said bottom deep drawn metallic element;
said flat flange tabs of the top and bottom deep drawn metallic elements are unified together to create a hermetically sealed whole hollow vessel, wherein the flat flange tab of the top deep drawn metallic element overlies the flat flange tab of the bottom deep drawn metallic element, and wherein the flat flange tab of the top deep drawn metallic element is curled over and around the flat flange tab of the bottom deep drawn metallic element, and wherein the heroically sealed whole hollow vessel can be manufactured by a mechanical press exerting a bonding pressure on said flat flange tabs of the top and bottom deep drawn metallic elements;
the hermetically sealed whole hollow vessel is in a vacuum state, wherein the vacuum state is created by:
inserting a plurality of needles through the plurality of aligned apertures, the compressible rubber material and apertures of the inserted grid assembly;
evacuating all air contents inside the hermetically sealed whole hollow vessel;
simultaneously withdrawing the plurality of needles;
and gluing the plurality of metallic sealing discs on an exterior side of the vacuum insulated panel over each said plurality of apertures of said bottom deep drawn metallic elements within said plurality of circular depressions; and
wherein the vacuum insulated panel can withstand an atmospheric force of 14 lbs./sq.

2. The vacuum insulation panel according to claim 1, wherein the compressible rubber material is a pre-formed compressible rubber packing seal.

3. The vacuum insulation panel according to claim 1, further comprising a polyurethane sealant disposed on top of each of the plurality of metallic sealing discs.

* * * * *